US006648791B2

(12) United States Patent
Kao et al.

(10) Patent No.: US 6,648,791 B2
(45) Date of Patent: Nov. 18, 2003

(54) FAMILY OF MULTI-SPEED POWER TRANSMISSION MECHANISMS HAVING THREE PLANETARY GEAR SETS

(75) Inventors: Chi-Kuan Kao, Troy, MI (US); Patrick Benedict Usoro, Troy, MI (US); Madhusudan Raghavan, West Bloomfield, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 09/963,882

(22) Filed: Sep. 26, 2001

(65) Prior Publication Data

US 2003/0060323 A1 Mar. 27, 2003

(51) Int. Cl.[7] .................................................. F16H 3/44
(52) U.S. Cl. ........................ 475/296; 475/271; 475/276; 475/280
(58) Field of Search ................................. 475/296, 276, 475/275, 280–286, 269, 271, 277, 288, 290

(56) References Cited

U.S. PATENT DOCUMENTS

| 5,122,103 | A | * | 6/1992 | Nakawaki et al. | 475/278 |
|---|---|---|---|---|---|
| 5,616,093 | A | * | 4/1997 | Long et al. | 475/120 |
| 5,879,264 | A | | 3/1999 | Raghavan et al. | 475/280 |
| 5,997,429 | A | | 12/1999 | Raghavan et al. | 475/280 |
| 6,217,474 | B1 | * | 4/2001 | Ross et al. | 475/269 |
| 6,422,968 | B1 | * | 7/2002 | Coffey | 475/275 |
| 6,422,969 | B1 | * | 7/2002 | Raghavan et al. | 475/276 |
| 6,425,841 | B1 | * | 7/2002 | Haka | 475/275 |

FOREIGN PATENT DOCUMENTS

| WO | 00/57081 | 9/2000 |
|---|---|---|
| WO | 00/57082 | 9/2000 |

OTHER PUBLICATIONS

United States publication 2002/0115522 filed Feb. 21, 2001 Raghavan et al.*

* cited by examiner

Primary Examiner—Sherry Estremsky
Assistant Examiner—Tisha D. Lewis
(74) Attorney, Agent, or Firm—Kathryn A. Marra

(57) ABSTRACT

A powertrain includes an engine and torque converter, a planetary transmission, and a final drive mechanism. The planetary transmission is selected from a family of transmissions wherein each family member has a first, a second, and a third planetary gear set; and each planetary gear set has a first, a second, and a third member. All of the family members have five torque transmitting mechanisms of the rotating type commonly named clutches. Each of the first members of the first and second planetary gear sets is continuously connected with a stationary portion of the transmission, and each of the first members of the third planetary gear set and the second member of the second planetary gear set are interconnected for common rotation by a connecting member. The input shaft is continuously connected with a member of one of the planetary gear sets, and the output shaft is continuously connected with another member of the planetary gear sets. The five clutches provide selective interconnections between members of the planetary gear sets and also between the planetary gear members and the input and output shaft. The clutches are engaged in combinations of two to establish at least six forward speeds and a reverse speed.

6 Claims, 16 Drawing Sheets

|          | Ratios | 50 | 52 | 54 | 56 | 58 |
|----------|--------|----|----|----|----|----|
| Reverse  | -1.49  |    |    | X  | X  |    |
| Neutral  | 0      |    |    |    |    |    |
| 1        | 2.82   | X  |    |    |    | X  |
| 2        | 1.45   |    |    | X  |    | X  |
| 3        | 1      |    | X  | X  |    |    |
| 4        | 0.7    |    | X  |    |    | X  |
| 5        | 0.58   |    | X  |    | X  |    |
| 6        | 0.46   |    |    |    | X  | X  |

(X=engaged clutch)

$\frac{\text{Ring Gear}}{\text{Sun Gear}}$ Tooth Ratio: $\quad \frac{R_1}{S_1}=1.50, \quad \frac{R_2}{S_2}=1.68, \quad \frac{R_3}{S_3}=2.32$

| Ratio Spread | 6.08  |
|--------------|-------|
| Ratio Steps  |       |
| Rev/1        | -0.53 |
| 1/2          | 1.95  |
| 2/3          | 1.45  |
| 3/4          | 1.43  |
| 4/5          | 1.2   |
| 5/6          | 1.25  |

| | Ratios | 150 | 152 | 154 | 156 | 158 |
|---|---|---|---|---|---|---|
| Reverse | -1.9 | | X | | X | |
| Neutral | 0 | | X | | | |
| 1 | 3.38 | | X | | | X |
| 2 | 2.34 | | X | X | | |
| 3 | 1.6 | | | X | | X |
| 4 | 1 | X | | X | | |
| 5 | 0.8 | X | | | | X |
| 6 | 0.6 | | | | X | X |

(X=engaged clutch)

$\dfrac{\text{Ring Gear}}{\text{Sun Gear}}$ Tooth Ratio: $\dfrac{R_1}{S_1}$ 1.50, $\dfrac{R_2}{S_2}=1.90$, $\dfrac{R_3}{S_3}=1.67$

| Ratio Spread | 5.62 |
|---|---|
| Ratio Steps | |
| Rev/1 | -0.56 |
| 1/2 | 1.44 |
| 2/3 | 1.46 |
| 3/4 | 1.6 |
| 4/5 | 1.25 |
| 5/6 | 1.33 |

| | Ratios | 250 | 252 | 254 | 256 | 258 |
|---|---|---|---|---|---|---|
| Reverse | -1.39 | X | X | | | |
| Neutral | 0 | | X | | | |
| 1 | 2.04 | | X | | | X |
| 2 | 1 | X | | | | X |
| 3 | 0.71 | | | X | | X |
| 4 | 0.43 | X | | X | | |
| 5 | 0.35 | | | X | X | |
| 6 | 0.28 | X | | | X | |

(X=engaged clutch)

Ring Gear / Sun Gear Tooth Ratio: $\frac{R_1}{S_1} = 1.86$, $\frac{R_2}{S_2} = 2.63$, $\frac{R_3}{S_3} = 1.53$

| Ratio Spread | 7.41 |
|---|---|
| Ratio Steps | |
| Rev/1 | -0.68 |
| 1/2 | 2.04 |
| 2/3 | 1.4 |
| 3/4 | 1.68 |
| 4/5 | 1.22 |
| 5/6 | 1.27 |

|  | Ratios | 350 | 352 | 354 | 356 | 358 |
|---|---|---|---|---|---|---|
| Reverse | -2 |  |  |  | X | X |
| Neutral | 0 |  |  |  |  | X |
| 1 | 3.32 |  | X |  |  | X |
| 2 | 2.36 | X |  |  |  | X |
| 3 | 1.63 | X | X |  |  |  |
| 4 | 1 | X |  | X |  |  |
| 5 | 0.8 |  | X | X |  |  |
| 6 | 0.6 |  | X |  | X |  |

(X=engaged clutch)

$\frac{\text{Ring Gear}}{\text{Sun Gear}}$ Tooth Ratio: $\frac{R_1}{S_1} = 2.00,\quad \frac{R_2}{S_2} = 1.58,\quad \frac{R_3}{S_3} = 1.60$

| Ratio Spread | 5.5 |
|---|---|
| Ratio Steps |  |
| Rev/1 | -0.6 |
| 1/2 | 1.4 |
| 2/3 | 1.45 |
| 3/4 | 1.63 |
| 4/5 | 1.24 |
| 5/6 | 1.33 |

| | Ratios | 450 | 452 | 454 | 456 | 458 |
|---|---|---|---|---|---|---|
| Reverse | -2 | | | X | X | |
| Neutral | 0 | | | | X | |
| 1 | 3.32 | | X | | X | |
| 2 | 2.36 | X | | | X | |
| 3 | 1.63 | X | X | | | |
| 4 | 1 | X | | X | | |
| 5 | 0.8 | | | X | | X |
| 6 | 0.6 | | X | X | | |

(X=engaged clutch)

$\frac{\text{Ring Gear}}{\text{Sun Gear}}$ Tooth Ratio: $\frac{R_1}{S_1}=2.00, \quad \frac{R_2}{S_2}=1.58, \quad \frac{R_3}{S_3}=1.60$

| Ratio Spread | 5.5 |
|---|---|
| Ratio Steps | |
| Rev/1 | -0.6 |
| 1/2 | 1.4 |
| 2/3 | 1.45 |
| 3/4 | 1.63 |
| 4/5 | 1.24 |
| 5/6 | 1.33 |

| | Ratios | 550 | 552 | 554 | 556 | 558 |
|---|---|---|---|---|---|---|
| Reverse | -2.51 | | X | | | X |
| Neutral | 0 | | X | | | |
| 1 | 4.15 | | | X | X | |
| 2 | 2.48 | | | X | | X |
| 3 | 1.42 | | | X | X | |
| 4 | 1 | | | | X | X |
| 5 | 0.75 | X | | | X | |
| 6 | 0.68 | | X | | X | |

(X=engaged clutch)

$\dfrac{\text{Ring Gear}}{\text{Sun Gear}}$ Tooth Ratio: $\dfrac{R_1}{S_1}=2.99$, $\dfrac{R_2}{S_2}=2.37$, $\dfrac{R_3}{S_3}=2.51$

| Ratio Spread | 6.1 |
|---|---|
| Ratio Steps | |
| Rev/1 | -0.6 |
| 1/2 | 1.67 |
| 2/3 | 1.74 |
| 3/4 | 1.42 |
| 4/5 | 1.34 |
| 5/6 | 1.1 |

| | Ratios | 650 | 652 | 654 | 656 | 658 |
|---|---|---|---|---|---|---|
| Reverse | -4.61 | | X | X | | |
| Neutral | 0 | | | X | | |
| 1 | 5.67 | | | X | X | |
| 2 | 2.84 | | X | | X | |
| 3 | 2 | X | | | X | |
| 4 | 1.21 | X | X | | | |
| 5 | 1 | X | | | | X |
| 6 | 0.78 | | X | | | X |

(X=engaged clutch)

$\dfrac{\text{Ring Gear}}{\text{Sun Gear}}$ Tooth Ratio: $\dfrac{R_1}{S_1} = 1.84$, $\dfrac{R_2}{S_2} = 2.63$, $\dfrac{R_3}{S_3} = 1.63$

| Ratio Spread | 7.27 |
|---|---|
| Ratio Steps | |
| Rev/1 | -0.81 |
| 1/2 | 2.00 |
| 2/3 | 1.42 |
| 3/4 | 1.66 |
| 4/5 | 1.21 |
| 5/6 | 1.28 |

| | Ratios | 750 | 752 | 754 | 756 | 758 |
|---|---|---|---|---|---|---|
| Reverse | -4.53 | | X | X | | |
| Neutral | 0 | | X | | | |
| 1 | 5.67 | | X | | | X |
| 2 | 2.84 | | | X | | X |
| 3 | 2 | X | | | | X |
| 4 | 1.2 | X | | X | | |
| 5 | 1 | X | | | X | |
| 6 | 0.79 | | | X | X | |

(X=engaged clutch)

$\dfrac{\text{Ring Gear}}{\text{Sun Gear}}$ Tooth Ratio: $\dfrac{R_1}{S_1}$ 1.84, $\dfrac{R_2}{S_2}=1.60$, $\dfrac{R_3}{S_3}=2.60$

| Ratio Spread | 7.18 |
|---|---|
| Ratio Steps | |
| Rev/1 | -0.8 |
| 1/2 | 2.00 |
| 2/3 | 1.42 |
| 3/4 | 1.66 |
| 4/5 | 1.2 |
| 5/6 | 1.27 |

| | Ratios | 850 | 852 | 854 | 856 | 858 |
|---|---|---|---|---|---|---|
| Reverse | -1.5 | X | | | | X |
| Neutral | 0 | | | | | |
| 1 | 2.92 | | | X | X | |
| 2 | 1.46 | | | X | | X |
| 3 | 1 | | X | | | X |
| 4 | 0.7 | | X | X | | |
| 5 | 0.58 | X | X | | | |
| 6 | 0.46 | X | | | X | |

(X=engaged clutch)

Ring Gear / Sun Gear Tooth Ratio: $\frac{R_1}{S_1}=1.50$, $\frac{R_2}{S_2}=1.53$, $\frac{R_3}{S_3}=2.33$

| Ratio Spread | 6.29 |
|---|---|
| Ratio Steps | |
| Rev/1 | -0.51 |
| 1/2 | 2.00 |
| 2/3 | 1.46 |
| 3/4 | 1.43 |
| 4/5 | 1.2 |
| 5/6 | 1.26 |

| | Ratios | 950 | 952 | 954 | 956 | 958 |
|---|---|---|---|---|---|---|
| Reverse | -1.5 | X | | | X | |
| Neutral | 0 | | | | X | |
| 1 | 2.92 | | | | X | X |
| 2 | 1.46 | | | X | X | |
| 3 | 1 | | X | | X | |
| 4 | 0.7 | | X | X | | |
| 5 | 0.58 | X | X | | | |
| 6 | 0.46 | X | | X | | |

(X=engaged clutch)

Ring Gear / Sun Gear Tooth Ratio:  $\frac{R_1}{S_1} = 1.50$,  $\frac{R_2}{S_2} = 1.53$,  $\frac{R_3}{S_3} = 2.33$

| Ratio Spread | 6.29 |
|---|---|
| Ratio Steps | |
| Rev/1 | -0.51 |
| 1/2 | 2 |
| 2/3 | 1.46 |
| 3/4 | 1.43 |
| 4/5 | 1.2 |
| 5/6 | 1.26 |

| | Ratios | 1050 | 1052 | 1054 | 1056 | 1058 |
|---|---|---|---|---|---|---|
| Reverse | -1.81 | | X | X | | |
| Neutral | 0 | | X | | | |
| 1 | 3.61 | | X | | | X |
| 2 | 2.23 | | | | X | X |
| 3 | 1.47 | X | | | | X |
| 4 | 1 | X | | X | | |
| 5 | 0.75 | | | | X | X |
| 6 | 0.62 | X | | | X | |

(X=engaged clutch)

$\dfrac{\text{Ring Gear}}{\text{Sun Gear}}$ Tooth Ratio: $\dfrac{R_1}{S_1} = 2.23$, $\dfrac{R_2}{S_2} = 2.53$, $\dfrac{R_3}{S_3} = 1.63$

| Ratio Spread | 5.83 |
|---|---|
| Ratio Steps | |
| Rev/1 | -0.5 |
| 1/2 | 1.62 |
| 2/3 | 1.52 |
| 3/4 | 1.47 |
| 4/5 | 1.34 |
| 5/6 | 1.21 |

| | Ratios | 1150 | 1152 | 1154 | 1156 | 1158 |
|---|---|---|---|---|---|---|
| Reverse | -2.9 | | X | X | | |
| Neutral | 0 | | | X | | |
| 1 | 5.78 | | | X | X | |
| 2 | 3.44 | | X | | X | |
| 3 | 2.44 | | | | X | X |
| 4 | 1.79 | | X | | | X |
| 5 | 1.47 | X | | | | X |
| 6 | 1.07 | | | X | | X |
| 7 | 1 | X | X | | | |

(X=engaged clutch)

$\frac{\text{Ring Gear}}{\text{Sun Gear}}$ Tooth Ratio: $\frac{R_1}{S_1}$ 2.44, $\frac{R_2}{S_2}$ =2.90, $\frac{R_3}{S_3}$ 2.70

| Ratio Spread | 5.39 (1/6) | 5.78 (1/7) |
|---|---|---|
| Ratio Steps | | |
| Rev/1 | -0.5 | -0.5 |
| 1/2 | 1.68 | 1.68 |
| 2/3 | 1.41 | 1.41 |
| 3/4 | 1.37 | 1.37 |
| 4/5 | 1.21 | 1.21 |
| 5/6 | 1.37 | 1.37 |
| 6/7 | - | 1.07 |

| | Ratios | 1250 | 1252 | 1254 | 1256 | 1258 |
|---|---|---|---|---|---|---|
| Reverse | -2.43 | X | | | X | |
| Neutral | 0 | | | | | |
| 1 | 3.14 | | X | | | X |
| 2 | 1.55 | X | | | | X |
| 3 | 1 | | | | X | X |
| 4 | 0.76 | | | X | | X |
| 5 | 0.61 | | | X | X | |
| 6 | 0.44 | | X | X | | |
| 7 | 0.39 | X | | X | | |

(X=engaged clutch)

$\dfrac{\text{Ring Gear}}{\text{Sun Gear}}$ Tooth Ratio: $\dfrac{R_1}{S_1} = 2.14,\quad \dfrac{R_2}{S_2} = 1.52,\quad \dfrac{R_3}{S_3} = 1.58$

| Ratio Spread | 7.15(1/6) | 8.1(1/7) |
|---|---|---|
| Ratio Steps | | |
| Rev/1 | -0.78 | -0.78 |
| 1/2 | 2.03 | 2.03 |
| 2/3 | 1.55 | 1.55 |
| 3/4 | 1.32 | 1.32 |
| 4/5 | 1.23 | 1.23 |
| 5/6 | 1.4 | 1.4 |
| 6/7 | - | 1.13 |

| | Ratios | 1350 | 1352 | 1354 | 1356 | 1358 |
|---|---|---|---|---|---|---|
| Reverse | -2.17 | X | X | | | |
| Neutral | 0 | X | | | | |
| 1 | 4.16 | X | | | | X |
| 2 | 2.73 | | X | | | X |
| 3 | 1.93 | | | | X | X |
| 4 | 1.2 | | X | | X | |
| 5 | 1 | | | X | | X |
| 6 | 0.73 | | X | X | | |
| 7 | 0.63 | X | | X | | |

(X=engaged clutch)

$\frac{Ring\ Gear}{Sun\ Gear}$ Tooth Ratio : $\frac{R_1}{S_1} = 2.73$, $\frac{R_2}{S_2} = 2.53$, $\frac{R_3}{S_3} = 1.73$

| Ratio Spread | 5.69(1/6) | 6.67(1/7) |
|---|---|---|
| Ratio Steps | | |
| Rev/1 | -0.52 | -0.52 |
| 1/2 | 1.52 | 1.52 |
| 2/3 | 1.42 | 1.42 |
| 3/4 | 1.6 | 1.6 |
| 4/5 | 1.2 | 1.2 |
| 5/6 | 1.37 | 1.37 |
| 6/7 | - | 1.15 |

| | Ratios | 1450 | 1452 | 1454 | 1456 | 1458 |
|---|---|---|---|---|---|---|
| Reverse | -2 | | | X | X | |
| Neutral | 0 | | | | X | |
| 1 | 3.32 | | X | | X | |
| 2 | 2.36 | X | | | X | |
| 3 | 1.63 | X | X | | | |
| 4 | 1 | X | | X | | |
| 5 | 0.8 | | | X | | X |
| 6 | 0.6 | | X | X | | |

(X=engaged clutch)

$\dfrac{\text{Ring Gear}}{\text{Sun Gear}}$ Tooth Ratio: $\quad \dfrac{R_1}{S_1} = 2.00, \quad \dfrac{R_2}{S_2} = 1.58, \quad \dfrac{R_3}{S_3} = 2.60$

| Ratio Spread | 5.5 |
|---|---|
| Ratio Steps | |
| Rev/1 | -0.6 |
| 1/2 | 1.4 |
| 2/3 | 1.45 |
| 3/4 | 1.63 |
| 4/5 | 1.24 |
| 5/6 | 1.33 |

| | Ratios | 1550 | 1552 | 1554 | 1556 | 1558 |
|---|---|---|---|---|---|---|
| Reverse | -1.5 | X | | | | X |
| Neutral | 0 | | | | | |
| 1 | 2.92 | | | X | X | |
| 2 | 1.46 | | | X | | X |
| 3 | 1 | | X | | | X |
| 4 | 0.7 | | X | X | | |
| 5 | 0.58 | X | X | | | |
| 6 | 0.46 | X | | X | | |

(X=engaged clutch)

$\frac{\text{Ring Gear}}{\text{Sun Gear}}$ Tooth Ratio: $\frac{R_1}{S_1}$ 1.50, $\frac{R_2}{S_2}=2.53$, $\frac{R_3}{S_3}=2.33$

| Ratio Spread | 6.29 |
|---|---|
| Ratio Steps | |
| Rev/1 | -0.51 |
| 1/2 | 2.00 |
| 2/3 | 1.46 |
| 3/4 | 1.43 |
| 4/5 | 1.2 |
| 5/6 | 1.26 | ated by five torque trans- # FAMILY OF MULTI-SPEED POWER TRANSMISSION MECHANISMS HAVING THREE PLANETARY GEAR SETS

TECHNICAL FIELD

The present invention relates to power transmissions and, more particularly, to a family of transmissions having three planetary gear sets that are controlled by five torque transmitting mechanisms to provide at least six forward speed ratios and one reverse ratio.

BACKGROUND OF THE INVENTION

Passenger vehicles include a powertrain that is comprised of an engine, multi-speed transmission and a differential or final drive. The multi-speed transmission increases the overall operating range of the vehicle by permitting the engine to operate through its torque range a number of times. The number of forward speed ratios that are available in the transmission determines the number of times the engine torque range is repeated. Early automatic transmissions had two speed ranges. This severely limited the overall speed range of the vehicle and therefore required a relatively large engine that could produce a wide speed and torque range. This resulted in the engine operating at a specific fuel consumption point, during cruising, other than the most efficient point. Therefore, manually shifted (countershaft) transmissions were the most popular.

With the advent of three and four speed automatic transmissions, the automatic shifting (planetary gear) transmission increased in popularity with the motoring public. These transmissions improve the operating performance and fuel economy of the vehicle. The increased number of speed ratios reduces the step size between ratios and therefore improves the shift quality of the transmission by making the ratio interchanges substantially imperceptible to the operator under normal vehicle acceleration. It has been suggested that the number of forward speed ratios be increased to five and even six speeds. This has been accomplished in many heavy truck powertrains. Six speed transmissions are disclosed in U.S. Pat. No. 4,070,927 issued to Polak on Jan. 31, 1978, U.S. Pat. No. 6,071,208 issued to Koivunen on Jun. 6, 2000, and U.S. Pat. No. 5,106,352 issued to Lepelletier on Apr. 21, 1992.

Six speed transmissions offer several advantages over four and five speed transmissions, including improved vehicle acceleration and improved fuel economy. While many trucks employ power transmissions, such as Polak, having six or more forward gear ratios, passenger cars are still manufactured with three and four speed automatic transmissions and relatively few five or six speed devices due to the size and complexity of these transmissions. The Polak transmission provides six forward speed ratios with three planetary gear sets, two clutches and three brakes. The Koivunen patent utilizes six torque transmitting devices including four brakes and two clutches to establish the six forward speed ratios and another reverse speed ratio. The Lepelletier employs three planetary gear sets, three clutches and two brakes to provide six forward speeds. One of the planetary gear sets is positioned and operated to establish two fixed speed input members for the remaining planetary gear sets.

SUMMARY OF THE INVENTION

It is an object of the present invention to provide an improved family of transmissions providing at least six forward speed ratios and one reverse speed ratio.

In one aspect of the present invention, each family member has three planetary gear sets each having three members consisting of a sun gear member, a ring gear member, and a planet carrier assembly member. In another aspect of the present invention, each family member includes five torque transmitting mechanisms that are operable to control the ratios in the planetary gear sets. In yet another aspect of the present invention, a member in the first planetary gear set is continuously interconnected with a member of the second planetary gear set through a first interconnecting member, and another member of the second planetary gear set is continuously interconnected with a member of the third planetary gear set through a second interconnecting member.

In still another aspect of the present invention, one of the interconnecting members is continuously interconnected with a stationary portion of the transmission. In yet still another aspect of the present invention, a transmission input shaft is interconnected with a member of one of the planetary gear sets, and a transmission output shaft is continuously interconnected with a member of one of the planetary gear sets. In a further aspect of the present invention, the torque transmitting mechanisms are all of the rotating type torque transmitting mechanisms (clutches) that are selectively interconnectable between members of the planetary gear sets with; a first clutch selectively interconnecting a member of the first planetary gear set with a member of either the second or third planetary gear set; a second clutch selectively interconnecting a member of the first planetary gear set with either a member of the second planetary gear set, or a member of the third planetary gear set, or the input shaft, or the output shaft; a third clutch selectively interconnecting a member of the third planetary gear set with either a member of the first planetary gear set, or a member of the second planetary gear set, or the input shaft, or the output shaft; a fourth clutch selectively interconnecting a member of the third planetary gear set with either the second interconnecting member, or a member of the first planetary gear set, or a member of the second planetary gear set, or the input shaft, or the output shaft. A fifth clutch selectively interconnecting a member of the third planetary gear set with either another member of the third planetary gear set, or a member of the first planetary gear set, or a member of the second planetary gear set, or the input shaft, or the output shaft. In yet a further aspect of the present invention, the clutches are engaged in combinations of two to provide at least six forward speed ratios and one reverse speed ratio. In still another aspect of the present invention, the family members provide a low-content, low cost six and seven speed transmission mechanisms.

This invention describes low-content, low-cost six- and seven-speed transmission mechanisms having three planetary gear sets and five selectable torque transmitting mechanisms (clutches). Each of the three planetary gear sets has three members. The first, second or third member of each planetary gear set can be any one of sun, ring or planet carrier assembly. The planet carrier assembly can be single- or double-pinion.

A first member of the first planetary gear set and a first member of the second planetary gear set are continuously connected with a stationary member. A connecting member continuously connects a second member of the second planetary gear set with a first member of the third planetary gear set. The input and output shafts are continuously connected with members of the planetary gear sets.

A first clutch selectively connects a member of the first planetary gear set with the third member of the second planetary gear set or a member of the third planetary gear set. A second clutch selectively connects a member of the first planetary gear set with said second fixed interconnection, a member of the third planetary gear set, a member of the second planetary gear set, input shaft or output shaft.

A third clutch selectively connects a member of the third planetary gear set with a member of the first planetary gear set, a member of the second planetary gear set, input shaft or output shaft. A fourth clutch selectively connects a member of the third planetary gear set with the said second fixed interconnection, a member of the first planetary gear set, a member of the second planetary gear set, input shaft or output shaft. A fifth clutch selectively connects a member of the third planetary gear set with another member of the third planetary gear set, a member of the first planetary gear set, a member of the second planetary gear set, input shaft or output shaft.

The five selectable torque transmission devices (clutches) are engaged in combinations of two to yield at least six forward speed ratios and one reverse speed ratio.

BRIEF DESCRIPTION OF THE DRAWINGS

FIG. 7 is schematic representation of a powertrain incorporating another embodiment of the present invention.

DESCRIPTION OF EXEMPLARY EMBODIMENTS

Figures 1, 2:
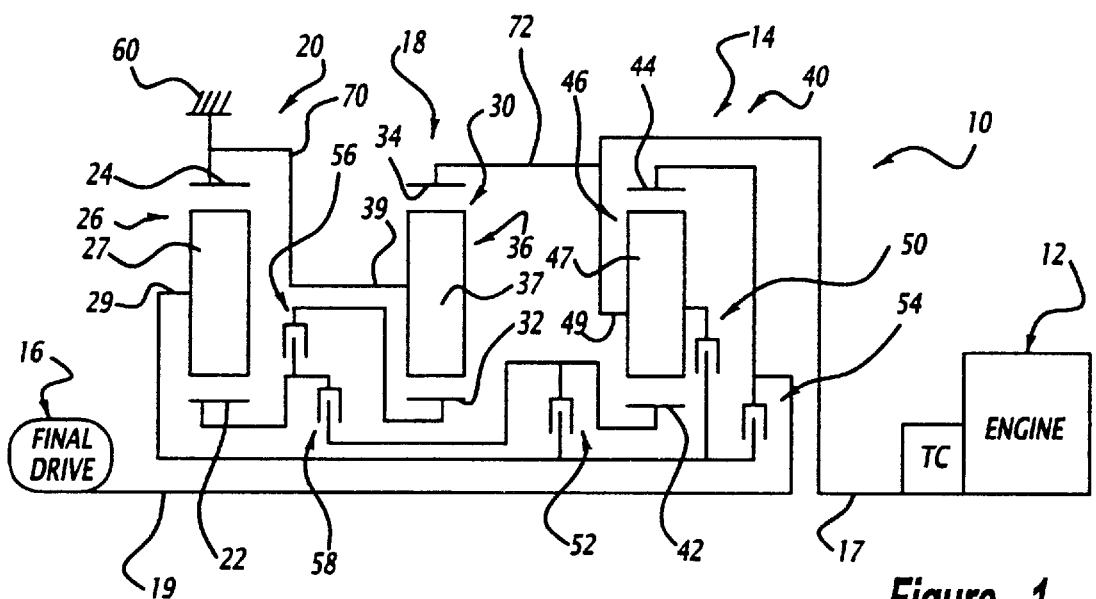
FIG. 1 is schematic representation of a powertrain incorporating one embodiment of the present invention.
FIG. 2 is a truth table and chart describing some of the operating characteristics of the powertrain depicted in FIG. 1.

A powertrain 10, shown in FIG. 1 illustrating one member of the transmission family, includes a conventional engine and torque converter 12, a planetary transmission 14, and a conventional final drive 16. The planetary transmission 14 includes an input shaft 17, a planetary gear arrangement 18, and an output shaft 19. The planetary gear arrangement 18 has three planetary gear sets 20, 30, and 40; and five rotating torque transmitting mechanisms (clutches) 50, 52, 54, 56, and 58. The torque transmitting mechanisms are conventional fluid-operated friction devices, the operation and control of which is well-known in the art. With the present invention, the torque transmitting mechanisms are preferably controlled by a conventional electro-hydraulic control mechanism, not shown, that includes a programmable digital computer.

The planetary gear set 20 includes a sun gear member 22, a ring gear member 24, and a planet carrier assembly member 26 that has a plurality of pinion gear members 27 rotatably mounted on a carrier member 29. The pinion gear members 27 are disposed in meshing relation with both the sun gear member 22 and the ring gear member 24. The planetary gear set 30 includes a sun gear member 32, a ring gear member 34, and a planet carrier assembly member 36 that has a plurality of pinion gear members 37 rotatably mounted on a carrier member 39 and disposed in meshing relation with both the sun gear member 32 and the ring gear member 34. The planetary gear set 40 includes a sun gear member 42, a ring gear member 44, and a planet carrier assembly member 46 that has a plurality of pinion gear members 47 rotatably disposed on a carrier member 49 and meshing with both the sun gear member 42 and the ring gear member 44.

A first connecting member 70 interconnects the ring gear member 24 and the planet carrier assembly member 36 with a transmission housing member 60. Those skilled in the art will recognize that the ring gear member 24 and the planet carrier assembly member 36 can be individually connected to housing portions of the transmission. A second connecting member 72 interconnects the planet carrier assembly member 46, the ring gear member 34, and the input shaft 17. The planet carrier assembly member 46, the ring gear member 34, and the input shaft 17 are selectively interconnectable with the planet carrier assembly member 26 through the selective engagement of the torque transmitting mechanism 50. The sun gear member 42 is selectively interconnectable with the planet carrier assembly member 26 through the selective engagement of the torque transmitting mechanism 52 and selectively interconnectable with the sun gear member 22 through the selective engagement of the torque transmitting mechanism 58. The ring gear member 44 and the output shaft 19 are selectively interconnectable through the selective engagement of the torque transmitting mechanism 54 with the planet carrier assembly member 26. The sun gear member 32 and the sun gear member 22 are selectively interconnectable through the selective engagement of the torque transmitting mechanism 56.

Judicious engagement of the torque transmitting mechanisms 50, 52, 54, 56, and 58 in combinations of two will, as seen in the truth table of FIG. 2, provide six forward speed ratios and a reverse speed ratio in the planetary gear arrangement 18 between the input shaft 17 and the output shaft 19. The reverse speed ratio is established with the engagement of the torque transmitting mechanisms 54 and 56. The sun gear member 32 is interconnected with the sun gear member 22, and the planet carrier assembly member 26 is interconnected with the output shaft 19. The sun gear member 32 and the sun gear member 22 are driven in reverse (opposite the input shaft 17) at a speed determined by the speed of the ring gear member 30 (input) and the ring gear/sun gear tooth ratio of the planetary gear set 30. The planet carrier assembly member 26 is driven in reverse at a speed determined by the speed of the sun gear member 22 and the ring gear/sun gear tooth ratio of the planetary gear set 20. The numerical value of the reverse speed ratio is determined by the ring gear/sun gear tooth ratios of the planetary gear sets 20 and 30. To establish a neutral condition, all of the torque transmitting mechanisms are disengaged.

The first forward speed ratio is established with the engagement of the torque transmitting mechanisms 50 and 58. The sun gear members 42 and 22 are driven forwardly at a speed determined by the speed of the planet carrier assembly member 26 (input) and the ring gear/sun gear tooth ratio of the planetary gear set 20. The ring gear member 44 and the output shaft 19 are driven forwardly at a reduced speed determined by the speed of the planet carrier assembly member 46 (input), the speed of the sun gear member 42, and the ring gear/sun gear tooth ratio of the planetary gear set 40. The numerical value of the first forward speed ratio is determined by the ring gear/sun gear tooth ratios of the planetary gear sets 20 and 40.

The second forward speed ratio is established by the engagement of the torque transmitting mechanisms 54 and 58. The 1-2 interchange is a single transition interchange. The sun gear members 22 and 42 are rotating reaction members having a speed determined by the speed of the planet carrier assembly member 26 and the ring gear/sun gear tooth ratio of the planetary gear set 20. The ring gear member 44, the planet carrier assembly member 26, and the output shaft 19 are driven forwardly at a reduced speed determined by the speed of the planet carrier assembly member 46, the speed of the sun gear member 42 and the ring gear/sun gear tooth ratio of the planetary gear set 40. The numerical value of the second forward speed ratio is determined by the ring gear/sun gear tooth ratios of the planetary gear sets 20 and 40.

The third forward speed ratio is established with the engagement of the torque transmitting mechanisms 52 and 54. The 2-3 interchange is a single transition interchange. The third forward speed ratio is a one to one ratio since the ring gear member 44 and the sun gear member 42 are interconnected and the planet carrier assembly member 46 is driven by the input shaft 17.

The fourth forward speed is established with the engagement of the torque transmitting mechanisms 52 and 58. The 3-4 interchange is a single transition interchange. The sun gear member 42 is held stationary and the planet carrier assembly member 46 is driven by the input shaft 17. Thus the ring gear member 44 and the output shaft 19 are driven forwardly at an increased speed determined by the speed of the planet carrier assembly member 46 and the ring gear/sun gear tooth ratio of the planetary gear set 40.

The fifth forward speed ratio is established with the engagement of the torque transmitting mechanisms 52 and 56. The 4-5 interchange is a single transition interchange. The sun gear members 32 and 22 are driven in reverse at a speed determined by the speed of the ring gear member 34 and the ring gear/sun gear tooth ratio of the planetary gear set 30. The planet carrier assembly member 26 and the sun gear member 42 are driven in reverse at a speed determined by the speed of the sun gear member 22 and the ring gear/sun gear tooth ratio of the planetary gear set 20. The ring gear member 44 and the output shaft 19 are driven forwardly at an increased speed determined by the speed of the planet carrier assembly member 46, the speed of the sun gear member 42, and the ring gear/sun gear tooth ratio of the planetary gear set 40. The numerical valve of the fifth forward ratio is determined by the ring gear/sun gear tooth ratios of the planetary gear sets 20, 30, and 40.

The sixth forward speed ratio is established with the engagement of the torque transmitting mechanisms 56 and 58. The 5-6 interchange is a single transition interchange. The sun gear member 32 and the sun gear member 42 are driven in reverse at a speed determined by the speed of the ring gear member 34 and the ring gear/sun gear tooth ratio of the planetary gear set 30. The ring gear member 44 and the output shaft 19 are driven forwardly at an increased speed determined by the speed of the planet carrier assembly member 46, the speed of the sun gear member 42, and the ring gear/sun gear tooth ratio of the planetary gear set 40. The numerical value of the sixth forward speed ratio is determined by the ring gear/sun gear tooth ratios of the planetary gear sets 30 and 40.

The charts in FIG. 2 describe the engagement schedule of the torque transmitting mechanisms 50, 52, 54, 56, and 58 during the establishment of the reverse speed ratio and the six forward speed ratios. FIG. 2 also provides an example of possible ring gear/sun gear tooth ratios for the planetary gear sets 20, 30, and 40 as well as speed ratio values that are attained with these ring gear/sun gear tooth ratios. FIG. 2 further provides the step ratios between adjacent speed ratios, the overall ratio spread of the forward speed ratios, and the reverse/first ratio step. As pointed out above, the single step interchanges are all of the single transition type.

Figures 3, 4:
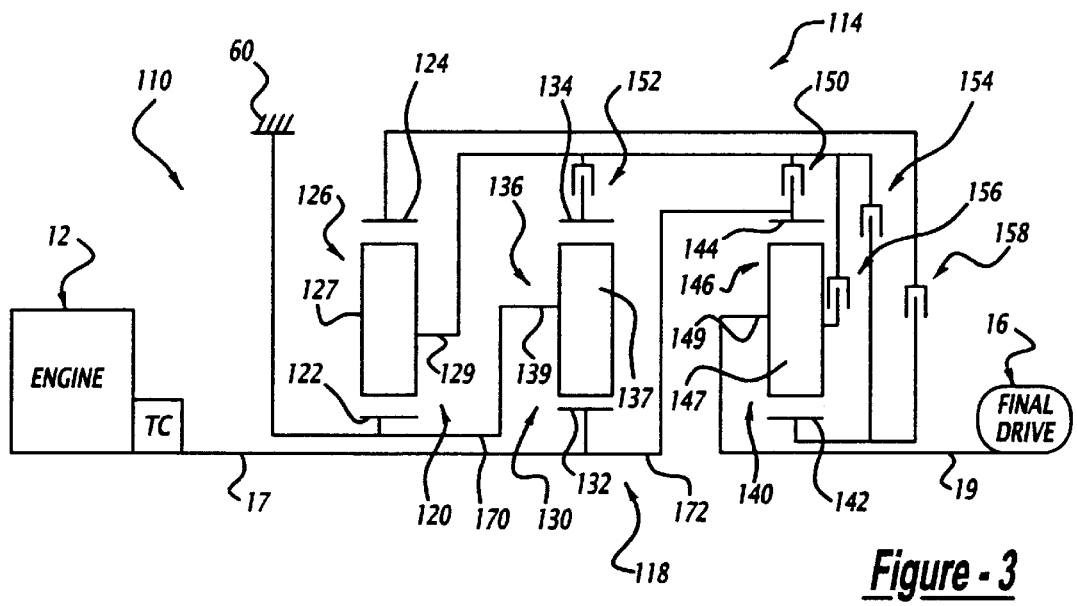
FIG. 3 is schematic representation of a powertrain incorporating another embodiment of the present invention.
FIG. 4 is a truth table and chart describing some of the operating characteristics of the powertrain depicted in FIG. 3.

A powertrain 110, shown in FIG. 3 includes a conventional engine and torque converter 12, a planetary transmission 114, and a conventional final drive mechanism 16. The planetary transmission 114 includes an input shaft 17, a planetary gear arrangement 118, and an output shaft 19. The planetary gear arrangement 118 has three planetary gear sets 120, 130, and 140; and five rotating torque transmitting mechanisms (clutches) 150, 152, 154, 156, and 158. The torque transmitting mechanisms are conventional fluid-operated friction devices, the operation and control of which is well-known in the art. With the present invention, the torque transmitting mechanisms are preferably controlled by a conventional electro-hydraulic control mechanism, not shown, that includes a programmable digital computer.

The planetary gear set 120 includes a sun gear member 122, a ring gear member 124, and a planet carrier assembly member 126 that has a plurality of pinion gear members 127 rotatably mounted on a carrier member 129. The pinion gear members 127 are disposed in meshing relation with both the sun gear member 122 and the ring gear member 124. The planetary gear set 130 includes a sun gear member 132, a ring gear member 134, and a planet carrier assembly member 136 that has a plurality of pinion gear members 137 rotatably mounted on a carrier member 139 and disposed in meshing relation with both the sun gear member 132 and the ring gear member 134. The planetary gear set 140 includes a sun gear member 142, a ring gear member 144, and a planet carrier assembly member 146 that has a plurality of pinion gear members 147 rotatably disposed on a carrier member 149 and meshing with both the sun gear member 142 and the ring gear member 144.

The sun gear member 122 and the planet carrier assembly member 136 are continuously interconnected with the housing 60 through a connecting member 170. The ring gear member 144 and the sun gear member 132 are continuously interconnected with the input shaft through a connecting member 172. The planet carrier assembly member 146 is continuously connected with the output shaft 19. The input shaft 17, the sun gear member 132, and the ring gear member 144 are selectively interconnected with the planet carrier assembly member 126 through the torque transmitting mechanism 150. The planet carrier assembly member 126 is selectively interconnected with the ring gear member 134 through the torque transmitting mechanism 152, with the sun gear member 142 through the torque transmitting mechanism 154, and with the output shaft 19 and the planet carrier assembly member 146 through the torque transmitting mechanism 156. The ring gear member 124 and the sun gear member 142 are selectively interconnected through the torque transmitting mechanism 158.

As seen in the truth table of FIG. 4, the torque transmitting mechanisms 150, 152, 154, 156, and 158 are selectively engaged in combinations of two to provide six forward speed ratios and a reverse speed ratio. The reverse speed ratio is established by the engagement of the torque transmitting mechanisms 152 and 156. During the reverse ratio, the ring gear member 134, the planet carrier assembly member 146 and the output shaft 19 are driven in reverse at a reduced speed determined by the speed of the sun gear member 132 and the ring gear/sun gear tooth ratio of the planetary gear set 130. A neutral condition is established by disengaging all of the torque transmitting mechanisms. However, during neutral, the torque transmitting mechanism 152 may remain engaged since it is engaged in the first forward speed ratio also, thus permitting a simpler forward/reverse interchange.

The first forward speed ratio is established with the engagement of the torque transmitting mechanisms 152 and 158. The ring gear member 134 and the planet carrier assembly member 126 are driven at a speed determined by the speed of the sun gear member 132 and the ring gear/sun gear tooth ratio of the planetary gear set 130. The ring gear member 124 and the sun gear member 142 are driven at a speed determined by the speed of the planet carrier assembly member 126 and the ring gear/sun gear tooth ratio of the planetary gear set 120. The planet carrier assembly member 146 and the output shaft 19 are driven forwardly at a speed determined by the speed of the ring gear member 144, the speed of the sun gear member 142, and the ring gear/sun gear tooth ratio of the planetary gear set 140. The numerical value of the first forward speed ratio is determined by the ring gear/sun gear tooth ratios of the planetary gear sets 120, 130 and 140.

The second forward speed ratio is established with the engagement of the torque transmitting mechanisms 152 and 154. The 1-2 interchange is a single transition ratio change. The ring gear member 134 and the sun gear member 142 are driven at a speed determined by the speed of the sun gear member 132 and the ring gear/sun gear tooth ratio of the planetary gear set 130. The planet carrier assembly member 146 and the output shaft 19 are driven forwardly at a reduced speed determined by the speed of the ring gear member 144, the speed of the sun gear member 142 and the ring gear/sun gear tooth ratio of the planetary gear set 140. The numerical value of the second forward speed ratio is determined by the ring gear/sun gear tooth ratios of the planetary gear sets 130 and 140.

The third forward speed ratio is established with the engagement of the torque transmitting mechanisms 154 and 158. The 1-3 and 2-3 interchanges are both single transition ratio changes. The sun gear member 142 is held stationary and the ring gear member 144 is driven forwardly by the input shaft 17. The planet carrier assembly member 146 and the output shaft 19 are driven forwardly at a reduced speed determined by the speed of the ring gear member 144 and the ring gear/sun gear tooth ratio of the planetary gear set 140. The numerical value of the third forward speed ratio is determined by the ring gear/sun gear tooth ratio of the planetary gear set 140.

The fourth forward speed ratio is established with the engagement of the torque transmitting mechanisms 150 and 154. The 2-4 and 3-4 interchanges are single transition ratio changes. The planetary gear set 140 is placed in a one to one condition with the interconnection of the ring gear member 144 and the sun gear member 142. Therefore, the fourth forward speed ratio is a one to one ratio.

The fifth forward speed ratio is established with the engagement of the torque transmitting mechanisms 150 and 158. The 3-5 and 4-5 interchanges are single transition ratio changes. The ring gear member 124 and the sun gear member 142 are driven at a speed determined by the speed of the planet carrier assembly member 126 and the ring gear/sun gear tooth ratio of the planetary gear set 120. The planet carrier assembly member 146 and the output shaft 19 are driven forwardly at an increased speed determined by the speed of the sun gear member 142, the speed of the ring gear member 144 and the ring gear/sun gear tooth ratio of the planetary gear set 140. The numerical value of the fifth forward speed ration is determined by the ring gear/sun gear tooth ratios of the planetary gear sets 120 and 140.

The sixth forward speed ratio is established with the engagement of the torque transmitting mechanisms 156 and 158. The 5-6 interchange is a single transition ratio change. The ring gear member 124 and the sun gear member 142 are driven at a speed determined by the speed of the planet carrier assembly member 126 (rotating reaction) and the ring gear/sun gear tooth ratio of the planetary gear set 120. The planet carrier assembly member 146 and the output shaft 19 are driven forwardly at a an increased speed determined by the speed of the sun gear member 142, the speed of the ring gear member 144, and the ring gear/sun gear tooth ratio of the planetary gear set 140. The numerical value of the sixth forward speed ratio is determined by the ring gear/sun gear tooth ratios of the planetary gear sets 120 and 140.

The charts in FIG. 4 describe the engagement schedule of the torque transmitting mechanisms 150, 152, 154, 156 and 158 during the establishment of the reverse speed ratio and the six forward speed ratios. FIG. 4 also provides an example of possible ring gear/sun gear tooth ratios for the planetary gear sets 120, 130, and 140 as well as speed ratio values that are attained with these ring gear/sun gear tooth ratios. FIG. 4 further provides the step ratios between adjacent speed ratios, the overall ratio spread of the forward speed ratios, and the reverse/first ratio step. As pointed out above, the single step interchanges are all of the single transition type.

Figures 5, 6:
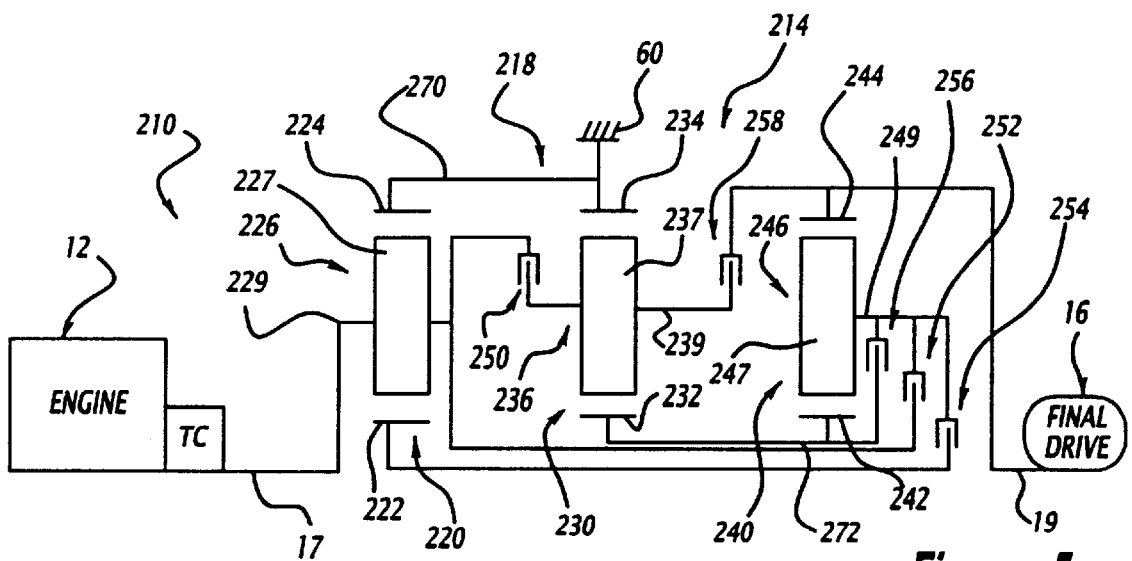
FIG. 5 is schematic representation of a powertrain incorporating another embodiment of the present invention.
FIG. 6 is a truth table and chart describing some of the operating characteristics of the powertrain depicted in FIG. 5.

A powertrain 210, shown in FIG. 5 includes a conventional engine and torque converter 12, a planetary transmission 214, and a conventional final drive mechanism 16. The planetary transmission 214 includes an input shaft 17, a planetary gear arrangement 218, and an output shaft 19. The planetary gear arrangement 218 has three planetary gear sets 220, 230, and 240; and five rotating torque transmitting mechanisms (clutches) 250, 252, 254, 256, and 258. The torque transmitting mechanisms are conventional fluid-operated friction devices, the operation and control of which is well known in the art. With the present invention, the torque transmitting mechanisms are preferably controlled by a conventional electro-hydraulic control mechanism, not shown, that includes a programmable digital computer.

The planetary gear set 220 includes a sun gear member 222, a ring gear member 224, and a planet carrier assembly member 226 that has a plurality of pinion gear members 227 rotatably mounted on a carrier member 229. The pinion gear members 227 are disposed in meshing relation with both the sun gear member 222 and the ring gear member 224. The planetary gear set 230 includes a sun gear member 232, a ring gear member 234, and a planet carrier assembly member 236 that has a plurality of pinion gear members 237 rotatably mounted on a carrier member 239 and disposed in meshing relation with both the sun gear member 232 and the ring gear member 234. The planetary gear set 240 includes a sun gear member 242, a ring gear member 244, and a planet carrier assembly member 246 that has a plurality of pinion gear members 247 rotatably disposed on a carrier member 249 and meshing with both the sun gear member 242 and the ring gear member 244.

The ring gear member 224 and the ring gear member 234 are continuously interconnected with the housing 60 either through a connecting member 270 or individually. The sun gear members 232 and 242 are continuously interconnected through a connecting member 272. The planet carrier assembly member 226 is continuously interconnected with the input shaft 19 and the ring gear member 244 is continuously interconnected with the output shaft 19. The planet carrier assembly member 226 and the input shaft 17 are selectively interconnected with the planet carrier assembly member 236 through the torque transmitting mechanism 250, and selectively interconnected with the planet carrier assembly member 246 through the torque transmitting mechanism 252. The planet carrier assembly member 236 is selectively interconnected with the ring gear member 244 and the output shaft 19 through the torque transmitting mechanism 258. The planet carrier assembly member 246 is selectively interconnected with the sun gear member 222 through the torque transmitting mechanism 254, and selectively interconnected with the sun gear members 232 and 242 through the torque transmitting mechanism 256.

As seen in the truth table of FIG. 6, the torque transmitting mechanisms 250, 252, 254, 256, and 258 are selectively engaged in combinations of two to establish six forward speed ratios and a reverse speed ratio between the input shaft 17 and the output shaft 19. The reverse speed ratio is established by the engagement of the torque transmitting mechanisms 250 and 252. The sun gear member 232 and the sun gear member 242 are driven forwardly at a speed determined by the speed of the planet carrier assembly member 236 (input) and the ring gear/sun gear tooth ratio of the planetary gear set 230. The ring gear member 244 and the output shaft 19 are driven in reverse at a speed determined by the speed of the sun gear member 242, the speed of the planet carrier assembly member 246 and the ring gear/sun gear tooth ratio of the planetary gear set 240. The numerical value of the reverse speed ratio is determined by the ring gear/sun gear tooth ratios of the planetary gear sets 230 and 240. A neutral condition is established by disengaging all of the torque transmitting mechanisms, however, the torque transmitting mechanism 252 may remain engaged, if desired, during the neutral condition to simplify a forward/reverse interchange.

The first forward speed ratio is established with the engagement of the torque transmitting mechanisms 252 and 258. The sun gear members 242 and 232 are driven at a speed determined by the speed of the planet carrier assembly member 246, the speed of the ring gear member 244 and the ring gear/sun gear tooth ratio of the planetary gear set 240. The planet carrier assembly member 236, the ring gear member 244, and the output shaft 19 are driven forwardly at a reduced speed determined by the speed of the planet carrier assembly member 246 (input), the speed of the sun gear member 242 (rotating reaction) and the ring gear/sun gear tooth ratio of planetary gear set 230. The numerical value of the first forward speed ratio is determined by the ring gear/sun gear tooth ratios of the planetary gear sets 230 and 240.

The second forward speed ratio is established with the engagement of the torque transmitting mechanisms 250 and 258. The 1-2 interchange is a single transition ratio change. The ring gear member 244 and the output shaft 19 are driven directly by the input shaft 17 through the planet carrier assembly member 226. Therefore, the second forward speed ratio is a one to one ratio.

The third forward speed ratio is established with the engagement of the torque transmitting mechanisms 254 and 258. The 2-3 and 1-3 interchanges are single transition ratio changes. The sun gear member 222 and planet carrier assembly member 246 are driven at a speed determined by the speed of the planet carrier assembly member 226 (input) and the ring gear/sun gear tooth ratio of the planetary gear set 220. The sun gear members 242 and 232 are driven at a speed determined by the speed of the planet carrier assembly member 246 and the ring gear/sun gear tooth ratio of the planetary gear set 240. The planet carrier assembly member 236, the ring gear member 244, and the output shaft are driven forwardly at an increased speed determined by the speed of the planet carrier assembly member 246, the speed of the sun gear member 242 (rotating reaction) and the ring gear/sun gear tooth ratio of the planetary gear set 230. The numerical value of the third forward speed ratio is determined by the ring gear/sun gear tooth ratios of the planetary gear sets 220, 230, and 240.

The fourth forward speed ratio is determined by the engagement of the torque transmitting mechanisms 250 and 254. The 3-4 and 2-4 interchanges are both single transition ratio changes. The sun gear member 222 and the planet carrier assembly member 246 are driven forwardly at a speed determined by the speed of the planet carrier assembly member 226 and the ring gear/sun gear tooth ratio of the planetary gear set 220. The sun gear member 232 and the sun gear member 242 are driven forwardly at a speed determined by the speed of the planet carrier assembly member 236 and the ring gear/sun gear tooth ratio of the planetary gear set 230. The ring gear member 244 and the output shaft 19 are driven forwardly at an increased speed determined by the speed of the planet carrier assembly member 246, the speed of the sun gear member 242, and the ring gear/sun gear tooth ratio of the planetary gear set 240. The numerical value of the fourth forward speed ratio is determined by the ring gear/sun gear tooth ratios of the planetary gear sets 220, 230, and 240.

The fifth forward speed ratio is established by the engagement of the torque transmitting mechanisms 254 and 256. The 4-5 and the 3-5 interchanges are both single transition ratio changes. The sun gear member 222, the planetary gear set 240, and the output shaft 19 are driven forwardly at an increased speed determined by the speed of the planet carrier assembly member 226 and the ring gear/sun gear tooth ratio of the planetary gear set 220. The fifth forward speed ratio is determined by the ring gear/sun gear tooth ratio of the planetary gear set 220.

The sixth forward speed ratio is established with the engagement of the torque transmitting mechanisms 250 and 256. The 5-6 and the 4-6 interchanges are both single transition ratio changes. The sun gear member 232, the planetary gear set 240, and the output shaft 19 are driven forwardly at an increased speed determined by the speed of the planet carrier assembly member 236 and the ring gear/sun gear tooth ratio of the planetary gear set 230. The numerical value of the sixth forward speed ratio is determined by the ring gear/sun gear tooth ratio of the planetary gear set 230.

The charts and tables in FIG. 6 describe the engagement schedule of the torque transmitting mechanisms 250, 252, 254, 256, and 258 during the establishment of the reverse speed ratio and the six forward speed ratios. FIG. 6 also provides an example of possible ring gear/sun gear tooth ratios for the planetary gear sets 220, 230, and 240 as well as speed ratio values that are attained with these ring gear/sun gear tooth ratios. FIG. 6 further provides the step ratios between adjacent speed ratios, the overall ratio spread of the forward speed ratios, and the reverse/first ratio step. As pointed out above, the single step interchanges are all of the single transition type.

A powertrain 310, shown in FIG. 7 includes a conventional engine and torque converter 12, a planetary transmission 314, and a conventional final drive mechanism 16. The planetary transmission 314 includes an input shaft 17, a planetary gear arrangement 318, and an output shaft 19. The planetary gear arrangement 318 has three planetary gear sets 320, 330, and 340; and five rotating torque transmitting mechanisms (clutches) 350, 352, 354, 356, and 358. The torque transmitting mechanisms are conventional fluid-operated friction devices, the operation and control of which is well-known in the art. With the present invention, the torque transmitting mechanisms are preferably controlled by a conventional electro-hydraulic control mechanism, not shown, that includes a programmable digital computer.

The planetary gear set 320 includes a sun gear member 322, a ring gear member 324, and a planet carrier assembly member 326 that has a plurality of pinion gear members 327 rotatably mounted on a carrier member 329. The pinion gear members 327 are disposed in meshing relation with both the sun gear member 322 and the ring gear member 324. The planetary gear set 330 includes a sun gear member 332, a ring gear member 334, and a planet carrier assembly member 336 that has a plurality of pinion gear members 337 rotatably mounted on a carrier member 339 and disposed in meshing relation with both the sun gear member 332 and the ring gear member 334. The planetary gear set 340 includes a sun gear member 342, a ring gear member 344, and a planet carrier assembly member 346 that has a plurality of pinion gear members 347 rotatably disposed on a carrier member 349 and meshing with both the sun gear member 342 and the ring gear member 344.

The planet carrier assembly member 326 and the sun gear member 332 are continuously interconnected with the housing 60 through a connecting member 370, and the ring gear member 334 and the sun gear member 342 are continuously interconnected through a connecting member 372. The ring gear member 344 is continuously interconnected with the input shaft 17, and the planet carrier assembly member 346 is continuously interconnected with the output shaft 19. The sun gear member 322, the ring gear member 324, and the planet carrier assembly member 336 are non-continuously interconnected with members of the other planetary gear sets. The sun gear member 322 is selectively interconnectable with the ring gear member 344 and the input shaft 17 through the torque transmitting mechanism 358. The ring gear member 324 is selectively interconnectable with the planet carrier assembly member 336 through the torque transmitting mechanism 352, selectively interconnectable with the ring gear member 334 and the sun gear member 342 through the torque transmitting mechanism 350, selectively interconnectable with the ring gear member 344 and the input shaft 17 through the torque transmitting mechanism 354, and selectively interconnectable with the planet carrier assembly member 346 and the output shaft 19 through the torque transmitting mechanism 356.

Figure 8:
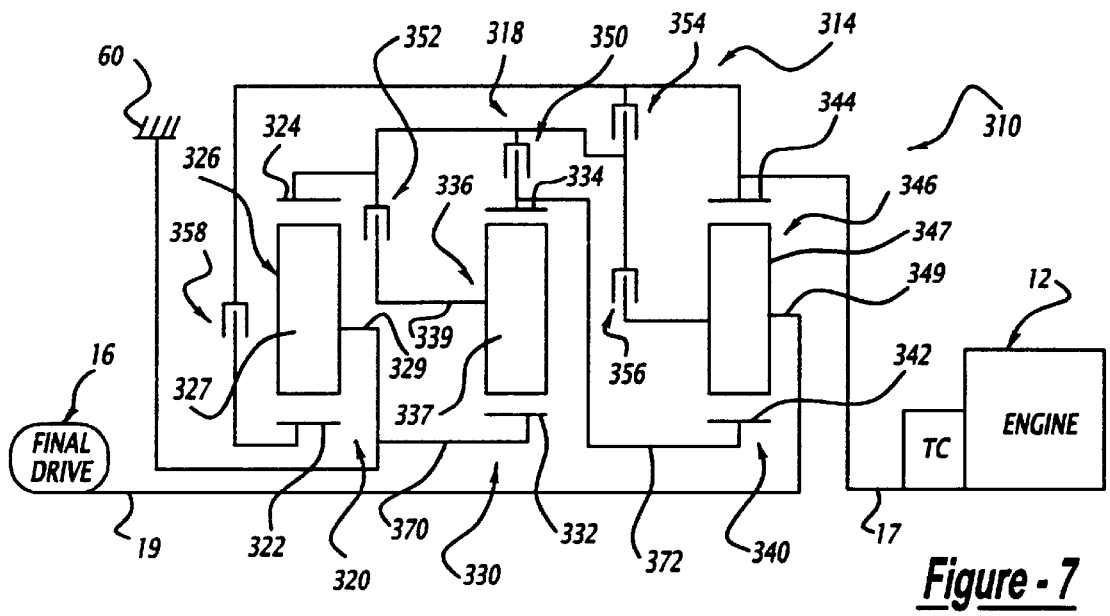
FIG. 8 is a truth table and chart describing some of the operating characteristics of the powertrain depicted in FIG. 7.

As seen in the truth table of FIG. 8, the torque transmitting mechanisms 350, 352, 354, 356, and 358 are selectively engaged in combinations of two to establish six forward speed ratios and a reverse speed ratio in the planetary gear arrangement 318 between the input shaft 17 and the output shaft 19. The reverse speed ratio is established with the engagement of the torque transmitting mechanisms 356 and 358. The ring gear member 324, the planet carrier assembly member 346, and the output shaft 19 are driven in reverse at a speed determined by the speed of the sun gear member 322 (input) and the ring gear/sun gear tooth ratio of the planetary gear set 320. The numerical value of the reverse speed ratio is determined by the ring gear/sun gear tooth ratio of the planetary gear set 320. A neutral condition is established with the disengagement of all of the torque transmitting mechanisms. However if desired, the torque transmitting mechanism 358 can remain engaged during the neutral condition to facilitate a forward/reverse interchange.

The first forward speed ratio is established with the engagement of the torque transmitting mechanisms 352 and 358. The ring gear member 324 and the planet carrier assembly member 336 are driven at a speed determined by the speed of the sun gear member 322 and the ring gear/sun gear tooth ratio of the planetary gear set 320. The ring gear member 334 and the sun gear member 342 are driven at a speed determined by the speed of the planet carrier assembly member 336 and the ring gear/sun gear tooth ratio of the planetary gear set 330. The planet carrier assembly member 346 is driven forwardly at a reduced speed determined by the speed of the ring gear member 344, the speed of the sun gear member 342, and the ring gear/sun gear tooth ratio of the planetary gear set 340. The numerical value of the first forward speed ratio is determined by the ring gear/sun gear tooth ratios of the planetary gear sets 320, 330, and 340.

The second forward speed ratio is established with the engagement of the torque transmitting mechanisms 350 and 358. The 1-2 interchange is a single transition ratio change. The ring gear member 324 and the sun gear member 342 are driven at a speed determined by the speed of the sun gear member 322 and the ring gear/sun gear tooth ratio of the planetary gear set 320. The planet carrier assembly member 346 and the output shaft 19 are driven forwardly at a reduced speed determined by the speed of the ring gear member 344, the speed of the sun gear member 342, and the ring gear/sun gear tooth ratio of the planetary gear set 340. The numerical value of the second forward speed ratio is determined by the ring gear/sun gear tooth ratios of the planetary gear sets 320 and 340.

The third forward speed ratio is established with the engagement of the torque transmitting mechanisms 350 and 352. The 2-3 and 1-3 interchanges are both single transition ratio changes. The engagement of the torque transmitting mechanisms 350 and 352 cause the planetary gear set 330 and the sun gear member 342 to be held stationary. The planet carrier assembly member 346 and the output shaft 19 are driven forwardly at a reduced speed determined by the speed of the ring gear member 344 and the ring gear/sun gear tooth ratio of the planetary gear set 340. The numerical value of the third forward speed ratio is determined by the ring gear/sun gear tooth ratio of the planetary gear set 340.

The fourth forward speed ratio is established with the engagement of the torque transmitting mechanisms 350 and 354. The 3-4 and 2-4 interchanges are both single transition ratio changes. This places the planetary gear set 340 in a one-to one condition such that the input shaft 17 and the output shaft 19 rotate in unison.

The fifth forward speed ratio is determined with the engagement of the torque transmitting mechanisms 352 and 354. Both of the 4-5 and 3-5 interchanges are single transition ratio changes. The ring gear member 334 and the sun gear member 342 are driven forwardly at a speed determined by the speed of the planet carrier assembly member 336 and the ring gear/sun gear tooth ratio of the planetary gear set 330. The planet carrier assembly member 346 and the output shaft 19 are driven forwardly at an increased speed determined by the speed of the ring gear member 344, the speed of the sun gear member 342, and the ring gear/sun gear tooth ratio of the planetary gear set 340. The numerical value of the fifth forward speed ratio is determined by the ring gear/sun gear tooth ratios of the planetary gear sets 330 and 340.

The sixth forward speed ratio is established with the engagement of the torque transmitting mechanisms 352 and 356. The 5-6 interchange is a single transition ratio change. The planet carrier assembly member 346 and the output shaft 19 are driven forwardly at an increased speed determined by the speed of the ring gear member 344, the speed of the sun gear member 342 and ring gear member 334, and the ring gear/sun gear tooth ratios of the planetary gear sets 330 and 340. The numerical value of the sixth forward speed ratio is determined by the ring gear/sun gear tooth ratios of the planetary gear sets 330 and 340.

The charts and tables in FIG. 8 describe the engagement schedule of the torque transmitting mechanisms 350, 352, 354, 356, and 358 during the establishment of the reverse speed ratio and the six forward speed ratios. FIG. 8 also provides an example of possible ring gear/sun gear tooth ratios for the planetary gear sets 320, 330, and 340 as well as speed ratio values that are attained with these ring gear/sun gear tooth ratios. FIG. 8 further provides the step ratios between adjacent speed ratios, the overall ratio spread of the forward speed ratios, and the reverse/first ratio step. As pointed out above, the single step interchanges are all of the single transition type.

Figures 9, 10:
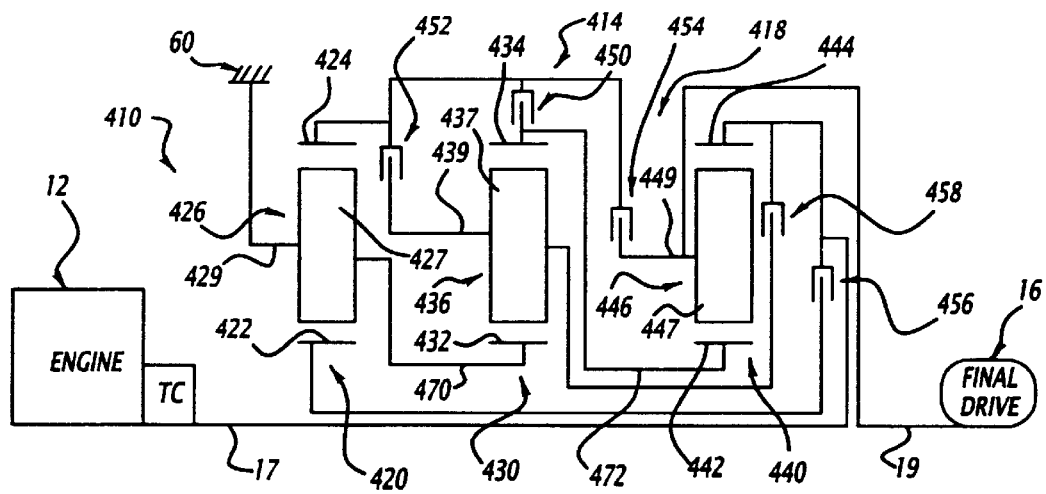
FIG. 9 is schematic representation of a powertrain incorporating another embodiment of the present invention.
FIG. 10 is a truth table and chart describing some of the operating characteristics of the powertrain depicted in FIG. 9.

A powertrain 410, shown in FIG. 9, includes a conventional engine and torque converter 12, a planetary transmission 414, and a conventional final drive mechanism 16. The planetary transmission 414 includes an input shaft 17, a planetary gear arrangement 418, and an output shaft 19. The planetary gear arrangement 418 has three planetary gear sets 420, 430, and 440; and five rotating torque transmitting mechanisms (clutches) 450, 452, 454, 456, and 458. The torque transmitting mechanisms are conventional fluid-operated friction devices, the operation and control of which is well-known in the art. With the present invention, the torque transmitting mechanisms are preferably controlled by a conventional electro-hydraulic control mechanism, not shown, that includes a programmable digital computer.

The planetary gear set 420 includes a sun gear member 422, a ring gear member 424, and a planet carrier assembly member 426 that has a plurality of pinion gear members 427 rotatably mounted on a carrier member 429. The pinion gear members 427 are disposed in meshing relation with both the sun gear member 422 and the ring gear member 424. The planetary gear set 430 includes a sun gear member 432, a ring gear member 434, and a planet carrier assembly member 436 that has a plurality of pinion gear members 437 rotatably mounted on a carrier member 439 and disposed in meshing relation with both the sun gear member 432 and the ring gear member 434. The planetary gear set 440 includes a sun gear member 442, a ring gear member 444, and a planet carrier assembly member 446 that has a plurality of pinion gear members 447 rotatably disposed on a carrier member 449 and meshing with both the sun gear member 442 and the ring gear member 444.

The planet carrier assembly member 426 and the sun gear member 432 are continuously interconnected with the housing through a connecting member 470. The ring gear member 434 and the sun gear member 442 are continuously interconnected through a connecting member 472. The ring gear member 444 is continuously interconnected with the input shaft 17 and the planet carrier assembly member 446 is continuously interconnected with the output shaft 19. The ring gear member 444 and the input shaft 17 are selectively interconnectable with the sun gear member 422 through the torque transmitting mechanism 456, and selectively interconnectable with the planet carrier assembly member 436 through the torque transmitting mechanism 458. The planet carrier assembly member 446 and the ring gear member 424 are selectively interconnected through the torque transmitting mechanism 454. The ring gear member 424 is selectively interconnected with the ring gear member 434 and the sun gear member 442 through the torque transmitting mechanism 450, and selectively interconnected with the planet carrier assembly member 436 through the torque transmitting mechanism 452.

As seen in the truth table of FIG. 10, the torque transmitting mechanisms 450, 452, 454, 456, and 458 are selectively engaged in combinations of two to establish six forward speed ratios and a reverse ratio in the planetary gear arrangement 418 between the input shaft 17 and the output shaft 19. A neutral condition is also provided with the disengagement of all of the torque transmitting mechanisms. However, the torque transmitting mechanism 456 may remain engaged during the neutral condition to simplify the reverse/forward interchange. The reverse speed ratio is established with the engagement of the torque transmitting mechanisms 454 and 456. The ring gear member 424 and the output shaft 19 are driven in reverse at a speed determined by the speed of the sun gear member 422 (input) and the ring gear/sun gear tooth ratio of the planetary gear set 420. The numerical value of the reverse speed ratio is determined by the ring gear/sun gear tooth ratio of the planetary gear set 420.

The first forward speed ratio is established with the engagement of the torque transmitting mechanisms 452 and 456. The ring gear member 424 and the planet carrier assembly member 436 are driven at a speed determined by the speed of the sun gear member 422 and the ring gear/sun gear tooth ratio of the planetary gear set 420. The ring gear member 434 and the sun gear member 442 are driven at a speed determined by the speed of the planet carrier assembly member 436 and the ring gear/sun gear tooth ratio of the planetary gear set 430. The planet carrier assembly member 446 and the output shaft 19 are driven forwardly at a reduced speed determined by the speed of the ring gear member 444, the speed of the sun gear member 442, and the ring gear/sun gear tooth ratio of the planetary gear set 440. The numerical value of the first forward speed ratio is determined by the ring gear/sun gear tooth ratios of the planetary gear sets 420, 430, and 440.

The second forward speed ratio is established by the engagement of the torque transmitting mechanisms 450 and 456. The 1-2 interchange is a single transition ratio change. The ring gear member 424 and the sun gear member 442 are driven at a speed determined by the speed of the sun gear member 422 (input) and the ring gear/sun gear tooth ratio of the planetary gear set 420. The planet carrier assembly member 446 and the output shaft 19 are driven forwardly at a reduced speed determined by the speed of the ring gear member 444 (input), the speed of the sun gear member 442, and the ring gear/sun gear tooth ratio of the planetary gear set 440. The numerical value of the second forward speed ratio is determined by the ring gear/sun gear tooth ratios of the planetary gear sets 420 and 440.

The third forward speed ratio is established with the engagement of the torque transmitting mechanisms 450 and 452. The 2-3 and the 1-3 interchanges are single transition ratio changes. This combination of torque transmitting mechanisms restrains rotation of the planetary gear set 430 and the sun gear member 442. The planet carrier assembly member 446 and the output shaft 19 are driven forwardly at a reduced speed determined by the speed of the ring gear member 444 (input) and the ring gear/sun gear tooth ratio of the planetary gear set 440. The numerical value of the third forward speed ratio is determined by the ring gear/sun gear tooth ratio of the planetary gear set 440.

The fourth forward speed ratio is established with the engagement of the torque transmitting mechanisms 450 and 454. The 3-4 and the 2-4 interchanges are both single transition ratio changes. This combination of torque transmitting mechanisms interconnects the sun gear member 442, the planet carrier assembly member 444 and the output shaft 19 such that the planetary gear set 440 rotates as a single unit. The fourth forward speed ratio is a one to one ratio.

The fifth forward speed ratio is established with the engagement of the torque transmitting mechanisms 454 and 458. The 4-5 interchange is a single transition ratio change. The ring gear member 434 and the sun gear member 442 are driven at a speed determined by the speed of the planet carrier assembly member 436 (input) and the ring gear/sun gear tooth ratio of the planetary gear set 430. The planet carrier assembly member 446 and the output shaft 19 are driven forwardly at an increased speed determined by the speed of the ring gear member 444, the speed of the sun gear member 442, and the ring gear/sun gear tooth ratio of the planetary gear set 440. The numerical value of the fifth forward speed ratio is determined by the ring gear/sun gear tooth ratios of the planetary gear sets 430 and 440.

The sixth forward speed ratio is established with the engagement of the torque transmitting mechanisms 452 and 454. The 5-6 and 4-6 interchanges are both single transition ratio changes. The planet carrier assembly member 436, the planet carrier assembly member 446 and the output shaft 19 are driven forwardly at an increased speed determined by the speed of the ring gear member 444 (input), the speed of the sun gear member 442 and the ring gear member 434 (rotating reactions), and the ring gear/sun gear tooth ratios of the planetary gear sets 430 and 440. The numerical value of the sixth forward speed ratio is determined by the ring gear/sun gear tooth ratios of the planetary gear sets 430 and 440.

The charts and tables in FIG. 10 describe the engagement schedule of the torque transmitting mechanisms 450, 452, 454, 456, and 458 during the establishment of the reverse speed ratio and the six forward speed ratios. FIG. 10 also provides an example of possible ring gear/sun gear tooth ratios for the planetary gear sets 420, 430, and 440 as well as speed ratio values that are attained with these ring gear/sun gear tooth ratios. FIG. 10 further provides the step ratios between adjacent speed ratios, the overall ratio spread of the forward speed ratios, and the reverse/first ratio step. As pointed out above, the single step interchanges are all of the single transition type.

Figures 11, 12:
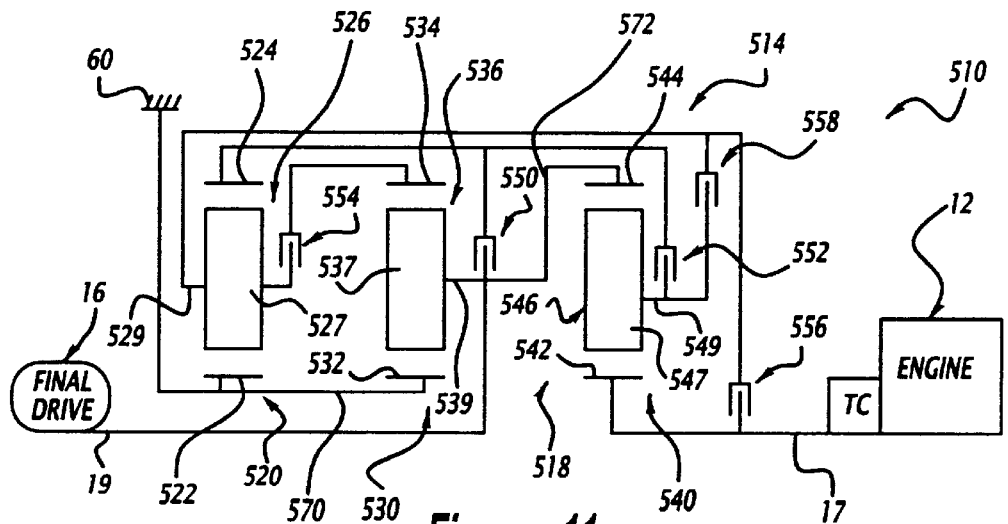
FIG. 11 is schematic representation of a powertrain incorporating another embodiment of the present invention.
FIG. 12 is a truth table and chart describing some of the operating characteristics of the powertrain depicted in FIG. 11.

A powertrain 510, shown in FIG. 11, has the conventional engine and torque converter 12, a planetary transmission 514, and the conventional final drive 16. The engine and torque converter 12 are drivingly connected with the transmission 514 through an input shaft 17. The transmission is drivingly connected with the final drive 16 through an output shaft 19. The planetary transmission 514 includes a planetary gear arrangement 518 that includes a first planetary gear set 520, a second planetary gear set 530 and a third planetary gear set 540. The planetary transmission also includes five torque transmitting mechanisms 550, 552, 554, 556, and 558 which are conventional selectively engageable fluid-operated devices.

The planetary gear set 520 includes a sun gear member 522, a ring gear member 524, and a planet carrier assembly member 526 that has a plurality of planet pinion gear members 527 rotatably mounted on a planet carrier 529 and disposed in meshing relation with the sun gear Member 522 and the ring gear member 524. The planetary gear set 530 includes a sun gear member 532, a ring gear member 534, and a planet carrier assembly member 536 that has a plurality of planet pinion gears 537 rotatably mounted on a planet carrier 539 and disposed in meshing relation with the sun gear member 532 and the ring gear member 534. The planetary gear set 540 has a sun gear member 542, a ring gear member 544, and a planet carrier assembly member 546 that includes a plurality of planet pinion gears 547 rotatably mounted on a planet carrier 549 and disposed in meshing relation with the sun gear member 542 and the ring gear member 544.

The sun gear member 522 and the sun gear member 532 are continuously interconnected with the housing 60 through the connecting member 570. The planet carrier assembly member 536 and ring gear member 544 are continuously interconnected with the connecting member 572 and the output shaft 19, and selectively interconnectable with the ring gear member 524 through the torque transmitting mechanism 550. The sun gear member 542 is continuously interconnected with the input shaft 17, and selectively interconnectable with the planet carrier assembly member 526 through the torque transmitting mechanism 556. The planet carrier assembly member 526 is selectively interconnectable with the ring gear member 534 through the torque transmitting mechanism 554, and selectively connectable with the planet carrier assembly member 546 through the torque transmitting mechanism 558. The planet carrier assembly member 546 and the ring gear member 524 are selectively interconnectable through the torque transmitting mechanism 552.

The truth table, shown in FIG. 12, defines the torque transmitting mechanism engagement required for each of the forward speed ratios and the reverse speed ratio. The truth table also indicates that the torque transmitting mechanism 552 can remain engaged during the neutral condition thereby simplifying the first/reverse interchange. The numerical values for the ratios have been determined using the ring gear/sun gear tooth ratios given in FIG. 12. The R1/S1 value is the ring gear/sun gear tooth ratio of the planetary gear set 520, the R2/S2 value is the ring gear/sun gear tooth ratio of the planetary gear set 530, and the R3/S3 value is the ring gear/sun gear tooth ratio of the planetary gear set 540. As can be determined from the truth table, the single ratio interchanges for the forward speed ratios are single transition interchanges. Also the double step interchanges such as $1^{st}$ to $3^{rd}$, $2^{nd}$ to $4^{th}$, $3^{rd}$ to $5^{th}$, and $4^{th}$ to $6^{th}$ are single transition interchanges. FIG. 12 also describes the step ratio between adjacent ratios, for example, the numerical step between $1^{st}$ and $2^{nd}$ is 1.67.

Those skilled in the art will recognize that the numerical value of the reverse speed ratio is determined by the planetary gear set 540. The numerical value of the first forward speed ratio is determined by the planetary gear sets 520, 530, and 540. The numerical value of the second forward speed ratio is determined by the planetary gear sets 530 and 540. The numerical value of the third forward speed ratio is determined by the planetary gear set 530. The numerical value of the fourth forward speed ratio is one to one. The numerical value of the fifth forward speed ratio is determined by the planetary gear set 520. The numerical value of the sixth forward speed ratio is determined by the planetary gear sets 520 and 540.

Figures 13, 14:
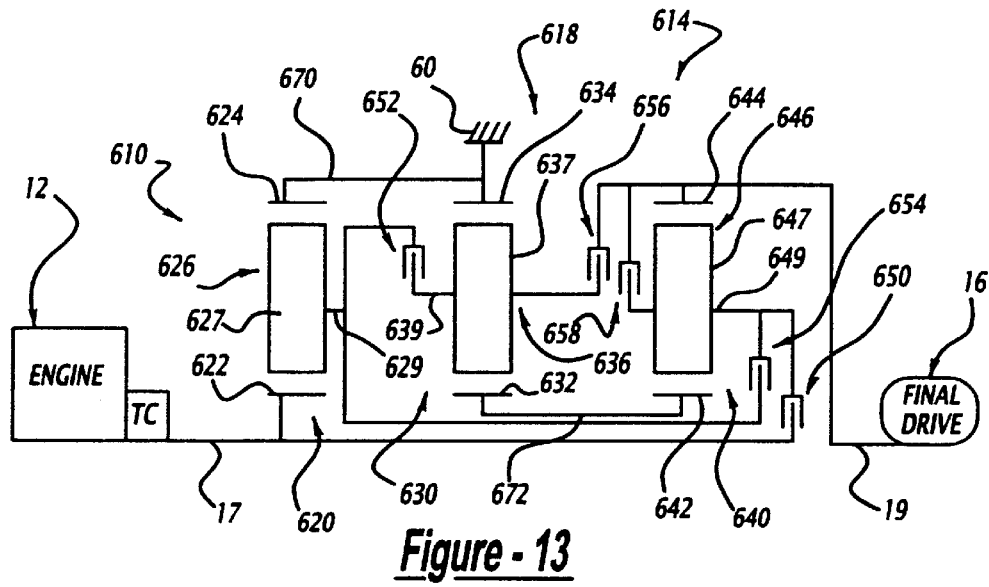
FIG. 13 is schematic representation of a powertrain incorporating one embodiment of the present invention.
FIG. 14 is a truth table and chart describing some of the operating characteristics of the powertrain depicted in FIG. 13.

A powertrain 610, shown in FIG. 13, has the conventional engine and torque converter 12, a planetary transmission 614, and the conventional final drive 16. The engine and torque converter 12 are drivingly connected with the transmission 614 through an input shaft 17. The transmission is drivingly connected with the final drive 16 through an output shaft 19. The planetary transmission 614 includes a planetary gear arrangement 618 that includes a first planetary gear set 620, a second planetary gear set 630 and a third planetary gear set 640. The planetary transmission also includes five torque transmitting mechanisms 650, 652, 654, 656, and 658 which are conventional selectively engageable fluid-operated devices.

The planetary gear set 620 includes a sun gear member 622, a ring gear member 624, and a planet carrier assembly member 626 that has a plurality of planet pinion gear members 627 rotatably mounted on a planet carrier 629 and disposed in meshing relation with the sun gear member 622 and the ring gear member 624. The planetary gear set 630 includes a sun gear member 632, a ring gear member 634, and a planet carrier assembly member 636 that has a plurality of planet pinion gears 637 rotatably mounted on a planet carrier 639 and disposed in meshing relation with the sun gear member 632 and the ring gear member 634. The planetary gear set 640 has a sun gear member 642, a ring gear member 644, and a planet carrier assembly member 646 that includes a plurality of planet pinion gears 647 rotatably mounted on a planet carrier 649 and disposed in meshing relation with the sun gear member 642 and the ring gear member 644.

The ring gear member 624 and the ring gear member 634 are continuously interconnected with the housing 60 through a connect member 670. The sun gear member 632 and the sun gear member 642 are continuously interconnected by the connecting member 672. The sun gear member 622 is continuously interconnected with the input shaft 17 and selectively interconnectable with the planet carrier assembly member 646 through the torque transmitting mechanism 650. The ring gear member 644 is continuously interconnected with the output shaft 19, selectively interconnectable with the planet carrier assembly member 646 through the torque transmitting mechanism 658, and selectively interconnectable with the planet carrier assembly member 636 through the torque transmitting mechanism 656. The planet carrier assembly member 626 is selectively interconnectable with the planet carrier assembly member 636 through the torque transmitting mechanism 652, and selectively interconnectable with the planet carrier assembly member 646 through the torque transmitting mechanism 654.

The truth table, shown in FIG. 14, defines the torque transmitting mechanism engagement schedule required for each of the forward speed ratios and the reverse speed ratio. The truth table also indicates that the torque transmitting mechanism 654 can remain engaged during the neutral condition thereby simplifying the first/reverse interchange. The numerical values for the ratios have been determined using the ring gear/sun gear tooth ratios given in FIG. 14. The R1/S1 value is the ring gear/sun gear tooth ratio of the planetary gear set 620, the R2/S2 value is the ring gear/sun gear tooth ratio of the planetary gear set 630, and the R3/S3 value is the ring gear/sun gear tooth ratio of the planetary gear set 640. As can be determined from the truth table, the single ratio interchanges for the forward speed ratios are single transition interchanges. Also the double step interchanges such as $1^{st}$ to $3^{rd}$, $2^{nd}$ to $4^{th}$, $3^{rd}$ to $5^{th}$, and $4^{th}$ to $6^{th}$ are single transition interchanges. FIG. 14 also describes the step ratio between adjacent ratios, for example, the numerical step between $1^{st}$ and $2^{nd}$ is 2.00.

Those skilled in the art will recognize that the numerical value of the reverse speed ratio is determined by the planetary gear sets 620, 630, and 640. The numerical value of the first forward speed ratio is determined by the planetary gear sets 620, 630, and 640. The numerical value of the second forward speed ratio is determined by the planetary gear set 620. The numerical value of the third forward speed ratio is determined by the planetary gear sets 630 and 640. The numerical value of the fourth forward speed ratio is determined by the planetary gear sets 620, 630, and 640. The numerical value of the fifth forward speed ratio is one to one. The numerical value of the sixth forward speed ratio is determined by the planetary gear sets 620 and 630.

Figures 15, 16:
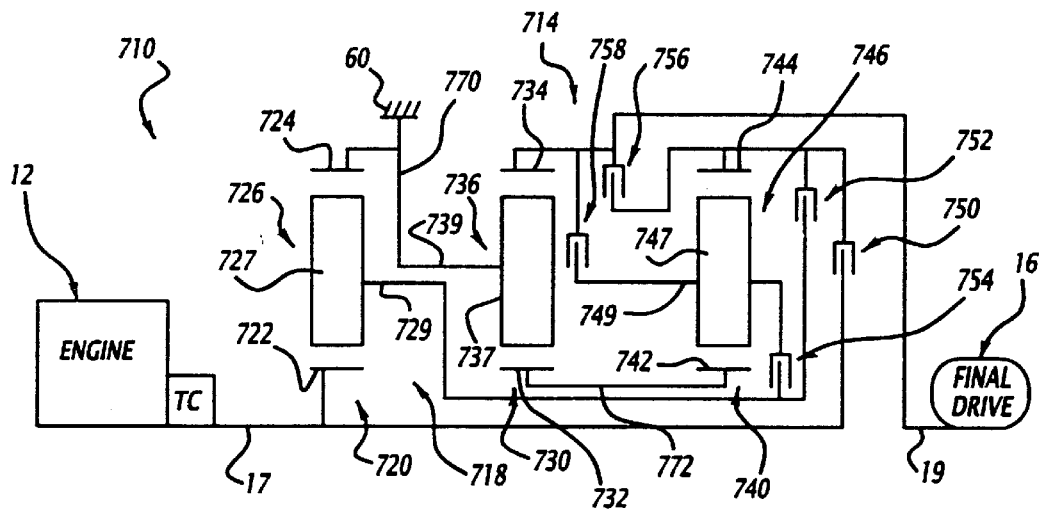
FIG. 15 is schematic representation of a powertrain incorporating another embodiment of the present invention.
FIG. 16 is a truth table and chart describing some of the operating characteristics of the powertrain depicted in FIG. 15.

A powertrain 710, shown in FIG. 15, has the conventional engine and torque converter 12, a planetary transmission 714, and the conventional final drive 16. The engine and torque converter 12 are drivingly connected with the transmission 714 through an input shaft 17. The transmission is drivingly connected with the final drive 16 through an output shaft 19. The planetary transmission 714 includes a planetary gear arrangement 718 that includes a first planetary gear set 720, a second planetary gear set 730 and a third planetary gear set 740. The planetary transmission also includes five torque transmitting mechanisms 750, 752, 754, 756, and 758 which are conventional selectively engageable fluid-operated devices.

The planetary gear set 720 includes a sun gear member 722, a ring gear member 724, and a planet carrier assembly member 726 that has a plurality of planet pinion gear members 727 rotatably mounted on a planet carrier 729 and disposed in meshing relation with the sun gear member 722 and the ring gear member 724. The planetary gear set 730 includes a sun gear member 732, a ring gear member 734, and a planet carrier assembly member 736 that has a plurality of planet pinion gears 737 rotatably mounted on a planet carrier 739 and disposed in meshing relation with the sun gear member 732 and the ring gear member 734. The planetary gear set 740 has a sun gear member 742, a ring gear member 744, and a planet carrier assembly member 746 that includes a plurality of planet pinion gears 747 rotatably mounted on a planet carrier 749 and disposed in meshing relation with the sun gear member 742 and the ring gear member 744.

The ring gear member 724 and the planet carrier assembly member 736 are continuously interconnected with the housing 60 through a connecting member 770. The sun gear member 732 and the sun gear member 742 are continuously interconnected through the connecting member 772. The sun gear member 722 is continuously interconnected with the input shaft 17, and selectively interconnectable with the ring gear member 744 through the torque transmitting mechanism 750. The ring gear member 734 is continuously interconnected with the output shaft 19, selectively interconnectable with the ring gear member 744 through the torque transmitting mechanism 756, and selectively interconnectable with the planet carrier assembly member 746 through the torque transmitting mechanism 758. The ring gear member 744 is selectively interconnectable with the planet carrier assembly member 726 through the torque transmitting mechanism 752. The planet carrier assembly member 746 is selectively interconnectable with the planet carrier assembly member 726 through the torque transmitting mechanism 754.

The truth table, shown in FIG. 16, defines the torque transmitting mechanism engagement required for each of the forward speed ratios and the reverse speed ratio. The truth table also indicates that the torque transmitting mechanism 752 can remain engaged during the neutral condition thereby simplifying the first/reverse interchange. The numerical values for the ratios have been determined using the ring gear/sun gear tooth ratios given in FIG. 16. The R1/S1 value is the ring gear/sun gear tooth ratio of the planetary gear set 720, the R2/S2 value is the ring gear/sun gear tooth ratio of the planetary gear set 730, and the R3/S3 value is the ring gear/sun gear tooth ratio of the planetary gear set 740. As can be determined from the truth table, the single ratio interchanges for the forward speed ratios are single transition interchanges. Also the double step interchanges such as $1^{st}$ to $3^{rd}$, $2^{nd}$ to $4^{th}$, $3^{rd}$ to $5^{th}$, and $4^{th}$ to $6^{th}$ are single transition interchanges. FIG. 16 also describes the step ratio between adjacent ratios, for example, the numerical step between $1^{st}$ and $2^{nd}$ is 2.00.

Those skilled in the art will recognize that the numerical value of the reverse speed ratio is determined by the planetary gear sets 720 and 730. The numerical value of the first forward speed ratio is determined by the planetary gear sets 720, 730, and 740. The numerical value of the second forward speed ratio is determined by the planetary gear set 720. The numerical value of the third forward speed ratio is determined by the planetary gear sets 730 and 740. The numerical value of the fourth forward speed ratio is determined by the planetary gear sets 720, 730, and 740. The numerical value of the fifth forward speed ratio is one to one. The numerical value of the sixth forward speed ratio is determined by the planetary gear sets 720, 730, and 740.

Figures 17, 18:
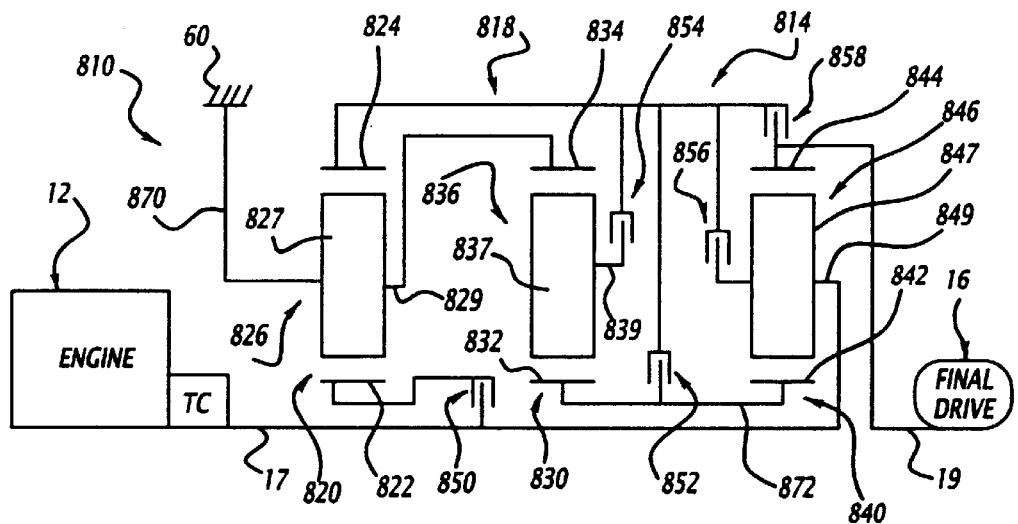
FIG. 17 is schematic representation of a powertrain incorporating another embodiment of the present invention.
FIG. 18 is a truth table and chart describing some of the operating characteristics of the powertrain depicted in FIG. 17.

A powertrain 810, shown in FIG. 17, has the conventional engine and torque converter 12, a planetary transmission 814, and the conventional final drive 16. The engine and torque converter 12 are drivingly connected with the transmission 814 through an input shaft 17. The transmission is drivingly connected with the final drive 16 through an output shaft 19. The planetary transmission 814 includes a planetary gear arrangement 818 that includes a first planetary gear set 820, a second planetary gear set 830 and a third planetary gear set 840. The planetary transmission also includes five torque transmitting mechanisms 850, 852, 854, 856, and 858 which are conventional selectively engageable fluid-operated devices.

The planetary gear set 820 includes a sun gear member 822, a ring gear member 824, and a planet carrier assembly member 826 that has a plurality of planet pinion gear members 827 rotatably mounted on a planet carrier 829 and disposed in meshing relation with the sun gear member 822 and the ring gear member 824. The planetary gear set 830 includes a sun gear member 832, a ring gear member 834, and a planet carrier assembly member 836 that has a plurality of planet pinion gears 837 rotatably mounted on a planet carrier 839 and disposed in meshing relation with the sun gear member 832 and the ring gear member 834. The planetary gear set 840 has a sun gear member 842, a ring gear member 844, and a planet carrier assembly member 846 that includes a plurality of planet pinion gears 847 rotatably mounted on a planet carrier 849 and disposed in meshing relation with the sun gear member 842 and the ring gear member 844.

The planet carrier assembly member 826 and the ring gear member 834 are continuously interconnected with the housing 60 through the connecting member 870. The sun gear member 832 and the sun gear member 842 are continuously interconnected through the connecting member 872, and selectively interconnectable with the ring gear member 824 through the torque transmitting mechanism 852. The planet carrier assembly member 846 is continuously interconnected with the input shaft 17, selectively interconnectable with the sun gear member 822 through the torque transmitting mechanism 850, and selectively interconnectable with the ring gear member 824 through the torque transmitting mechanism 856. The ring gear member 844 is continuously interconnected with the output shaft 19, and selectively interconnectable with the ring gear member 824 through the torque transmitting mechanism 858. The planet carrier assembly member 836 and the ring gear member 824 are selectively interconnectable through the torque transmitting mechanism 854.

The truth table, shown in FIG. 18, defines the torque transmitting mechanism engagement schedule required for each of the forward speed ratios and the reverse speed ratio. A neutral condition is established with the disengagement of all of the torque transmitting mechanisms. The numerical values for the ratios have been determined using the ring gear/sun gear tooth ratios given in FIG. 18. The R1/S1 value is the ring gear/sun gear tooth ratio of the planetary gear set 820, the R2/S2 value is the ring gear/sun gear tooth ratio of the planetary gear set 830, and the R3/S3 value is the ring gear/sun gear tooth ratio of the planetary gear set 840. As can be determined from the truth table, the single ratio interchanges for the forward speed ratios are single transition interchanges. Also, many of the double step interchanges such as $2^{nd}$ to $4^{th}$, $3^{rd}$ to $5^{th}$, and $4^{th}$ to $6^{th}$ are single transition interchanges. FIG. 18 also describes the step ratio between adjacent ratios, for example, the numerical step between $1^{st}$ and $2^{nd}$ is 2.00.

Those skilled in the art will recognize that the numerical value of the reverse speed ratio is determined by the planetary gear set 820. The numerical value of the first forward speed ratio is determined by the planetary gear sets 830 and 840. The numerical value of the second forward speed ratio is determined by the planetary gear sets 830 and 840. The numerical value of the third forward speed ratio is one to one. The numerical value of the fourth forward speed ratio is determined by the planetary gear set 840. The numerical value of the fifth forward speed ratio is determined by the planetary gear sets 820 and 840. The numerical value of the sixth forward speed ratio is determined by the planetary gear sets 820, 830, and 840.

Figures 19, 20:
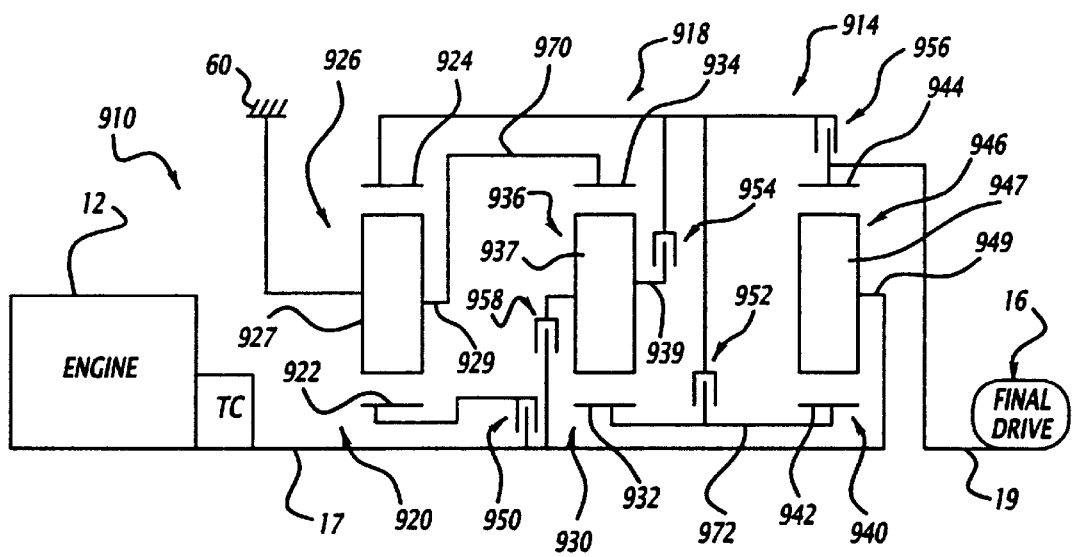
FIG. 19 is schematic representation of a powertrain incorporating another embodiment of the present invention.
FIG. 20 is a truth table and chart describing some of the operating characteristics of the powertrain depicted in FIG. 19.

A powertrain 910, shown in FIG. 19, has the conventional engine and torque converter 12, a planetary transmission 914, and the conventional final drive 16. The engine and torque converter 12 are drivingly connected with the transmission 914 through an input shaft 17. The transmission is drivingly connected with the final drive 16 through an output shaft 19. The planetary transmission 914 includes a planetary gear arrangement 918 that includes a first planetary gear set 920, a second planetary gear set 930 and a third planetary gear set 940. The planetary transmission also includes five torque transmitting mechanism 950, 952, 954, 956, and 958 which are conventional selectively engageable fluid-operated devices.

The planetary gear set 920 includes a sun gear member 922, a ring gear member 924, and a planet carrier assembly member 926 that has a plurality of planet pinion gear members 927 rotatably mounted on a planet carrier 929 and disposed in meshing relation with the sun gear member 922 and the ring gear member 924. The planetary gear set 930 includes a sun gear member 932, a ring gear member 934, and a planet carrier assembly member 936 that has a plurality of planet pinion gears 937 rotatably mounted on a planet carrier 939 and disposed in meshing relation with the sun gear member 932 and the ring gear member 934. The planetary gear set 940 has a sun gear member 942, a ring gear member 944, and a planet carrier assembly member 946 that includes a plurality of planet pinion gears 947 rotatably mounted on a planet carrier 949 and disposed in meshing relation with the sun gear member 942 and the ring gear member 944.

The planet carrier assembly member 926 and the ring gear member 934 are continuously interconnected with the housing 60 through the connecting member 970. The sun gear member 932 and the sun gear member 942 are continuously interconnected through the connecting member 972, and selectively interconnectable with the ring gear member 924 through the torque transmitting mechanism 952. The planet carrier assembly member 946 is continuously interconnected with the input shaft 17, selectively interconnectable with the sun gear member 922 through the torque transmitting mechanism 950, and selectively interconnectable with the planet carrier assembly member 936 through the torque transmitting mechanism 958. The ring gear member 944 is continuously interconnected with the output shaft 19, and selectively interconnectable with the ring gear member 924 through the torque transmitting mechanism 956. The ring gear member 926 is selectively interconnectable with the planet carrier assembly member 936 through the torque transmitting mechanism 954.

The truth table, shown in FIG. 20, defines the torque transmitting mechanism engagement required for each of the forward speed ratios and the reverse speed ratio. The truth table also indicates that the torque transmitting mechanism 956 can remain engaged during the neutral condition thereby simplifying the first/reverse interchange. The numerical values for the ratios have been determined using the ring gear/sun gear tooth ratios given in FIG. 20. The R1/S1 value is the ring gear/sun gear tooth ratio of the planetary gear set 920, the R2/S2 value is the ring gear/sun gear tooth ratio of the planetary gear set 930, and the R3/S3 value is the ring gear/sun gear tooth ratio of the planetary gear set 940. As can be determined from the truth table, the single ratio interchanges for the forward speed ratios are single transition interchanges. Also the double step interchanges such as $1^{st}$ to $3^{rd}$, $2^{nd}$ to $4^{th}$, $3^{rd}$ to $5^{th}$, and $4^{th}$ to $6^{th}$ are single transition interchanges. FIG. 20 also describes the step ratio between adjacent ratios, for example, the numerical step between $1^{st}$ and $2^{nd}$ is 2.00.

Those skilled in the art will recognize that the numerical value of the reverse speed ratio is determined by the planetary gear set 920. The numerical value of the first forward speed ratio is determined by the planetary gear sets 930 and 940. The numerical value of the second forward speed ratio is determined by the planetary gear sets 930 and 940. The numerical value of the third forward speed ratio is one to one. The numerical value of the fourth forward speed ratio is determined by the planetary gear set 940. The numerical value of the fifth forward speed ratio is determined by the planetary gear sets 920 and 940. The numerical value of the sixth forward speed ratio is determined by the planetary gear sets 920, 930, and 940.

Figures 21, 22:
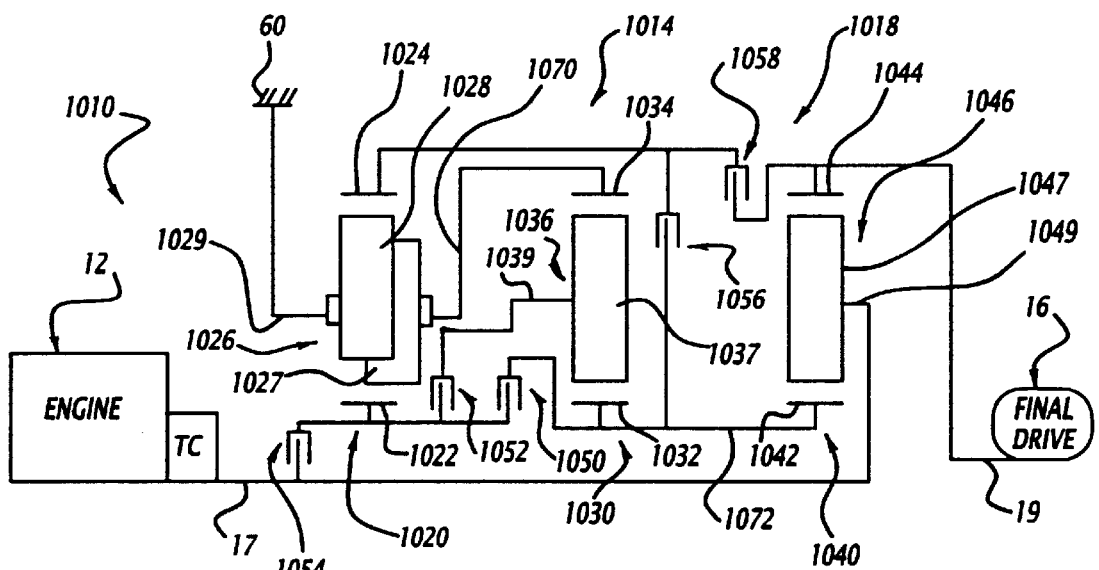
FIG. 21 is schematic representation of a powertrain incorporating another embodiment of the present invention.
FIG. 22 is a truth table and chart describing some of the operating characteristics of the powertrain depicted in FIG. 21.

A powertrain 1010, shown in FIG. 21, has the conventional engine and torque converter 12, a planetary transmission 1014, and the conventional final drive 16. The engine and torque converter 12 are drivingly connected with the transmission 1014 through an input shaft 17. The transmission is drivingly connected with the final drive 16 through an output shaft 19. The planetary transmission 1014 includes a planetary gear arrangement 1018 that includes a first planetary gear set 1020, a second planetary gear set 1030 and a third planetary gear set 1040. The planetary transmission also includes five torque transmitting mechanisms 1050, 1052, 1054, 1056, and 1058 which are conventional selectively engageable fluid-operated devices.

The planetary gear set 1020 includes a sun gear member 1022, a ring gear member 1024, and a planet carrier assembly member 1026 that has a plurality of intermeshing planet pinion gear members 1027 and 1028 rotatably mounted on a planet carrier 1029 and disposed in meshing relation with the sun gear member 1022 and the ring gear member 1024, respectively. The planetary gear set 1030 includes a sun gear member 1032, a ring gear member 1034, and a planet carrier assembly member 1036 that has a plurality of planet pinion gears 1037 rotatably mounted on a planet carrier 1039 and disposed in meshing relation with the sun gear member 1032 and the ring gear member 1034. The planetary gear set 1040 has a sun gear member 1042, a ring gear member 1044, and a planet carrier assembly member 1046 that includes a plurality of planet pinion gears 1047 rotatably mounted on a planet carrier 1049 and disposed in meshing relation with the sun gear member 1042 and the ring gear member 1044.

The planet carrier assembly member 1022 and the ring gear member 1034 are continuously interconnected with the housing 60 through a connecting member 1070. The sun gear member 1032 and the sun gear member 1042 are continuously interconnected through a connecting member 1072, selectively interconnectable with the sun gear member 1022 through the torque transmitting mechanism 1050, and selectively interconnectable with the ring gear member 1024 through the torque transmitting mechanism 1056. The planet carrier assembly member 1046 is continuously interconnected with the input shaft 17, and selectively interconnectable with the sun gear member 1022 through the torque transmitting mechanism 1054. The ring gear member 1044 is continuously interconnected with the output shaft 19, and selectively interconnectable with the ring gear member 1024 through the torque transmitting mechanism 1058. The sun gear member 1022 is selectively interconnectable with the planet carrier assembly member 1036 through the torque transmitting mechanism 1052.

The truth table, shown in FIG. 22, defines the torque transmitting mechanism engagement schedule required for each of the forward speed ratios and the reverse speed ratio. The truth table also indicates that the torque transmitting mechanism 1052 can remain engaged during the neutral condition thereby simplifying the first/reverse interchange. The numerical values for the ratios have been determined using the ring gear/sun gear tooth ratios given in FIG. 22. The R1/S1 value is the ring gear/sun gear tooth ratio of the planetary gear set 1020, the R2/S2 value is the ring gear/sun gear tooth ratio of the planetary gear set 1030, and the R3/S3 value is the ring gear/sun gear tooth ratio of the planetary gear set 1040. As can be determined from the truth table, the single ratio interchanges for the forward speed ratios are single transition interchanges. Also, most of the double step interchanges such as $1^{st}$ to $3^{rd}$, $2^{nd}$ to $4^{th}$ and $4^{th}$ to $6^{th}$ are single transition interchanges. FIG. 22 also describes the step ratio between adjacent ratios, for example, the numerical step between $1^{st}$ and $2^{nd}$ is 1.62.

Those skilled in the art will recognize that the numerical value of the reverse speed ratio is determined by the planetary gear sets 1030 and 1040. The numerical value of the first forward speed ratio is determined by the planetary gear sets 1020, 1030, and 1040. The numerical value of the second forward speed ratio is determined by the planetary gear set 1020. The numerical value of the third forward speed ratio is determined by the planetary gear sets 1020 and 1040. The numerical value of the fourth forward speed ratio is one to one. The numerical value of the fifth forward speed ratio is determined by the planetary gear sets 1020 and 1040. The numerical value of the sixth forward speed ratio is determined by the planetary gear set 1040.

Figures 23, 24:
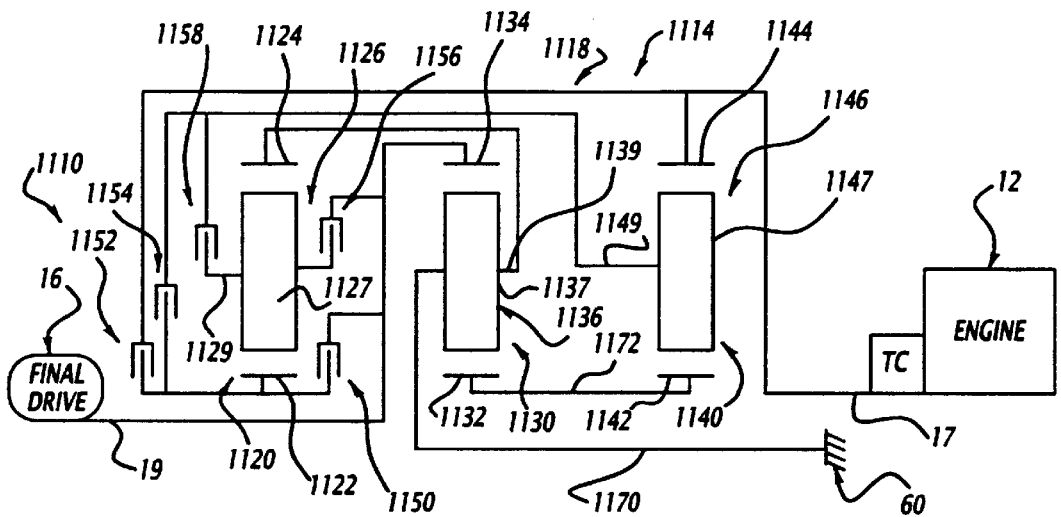
FIG. 23 is schematic representation of a powertrain incorporating another embodiment of the present invention.
FIG. 24 is a truth table and chart describing some of the operating characteristics of the powertrain depicted in FIG. 23

A powertrain 1110, shown in FIG. 23, has the conventional engine and torque converter 12, a planetary transmission 1114, and the conventional final drive 16. The engine and torque converter 12 are drivingly connected with the transmission 1114 through an input shaft 17. The transmission is drivingly connected with the final drive 16 through an output shaft 19. The planetary transmission 1114 includes a planetary gear arrangement 1118 that includes a first planetary gear set 1120, a second planetary gear set 1130 and a third planetary gear set 1140. The planetary transmission also includes five torque transmitting mechanisms 1150, 1152, 1154, 1156, and 1158 which are conventional selectively engageable fluid-operated devices. As seen in FIG. 24, the planetary gear arrangement 1118 can be controlled to provide either six or seven forward speed ratios.

The planetary gear set 1120 includes a sun gear member 1122, a ring gear member 1124, and a planet carrier assembly member 1126 that has a plurality of planet pinion gear members 1127 rotatably mounted on a planet carrier 1129 and disposed in meshing relation with the sun gear member 1122 and the ring gear member 1124. The planetary gear set 1130 includes a sun gear member 1132, a ring gear member 1134, and a planet carrier assembly member 1136 that has a plurality of planet pinion gears 1137 rotatably mounted on a planet carrier 1139 and disposed in meshing relation with the sun gear member 1132 and the ring gear member 1134. The planetary gear set 1140 has a sun gear member 1142, a ring gear member 1144, and a planet carrier assembly member 1146 that includes a plurality of planet pinion gears 1147 rotatably mounted on a planet carrier 1149 and disposed in meshing relation with the sun gear member 1142 and the ring gear member 1144.

The ring gear member 1124 and the planet carrier assembly member 1136 are continuously interconnected with the housing 60 through a connecting member 1170. The sun gear member 1132 and the sun gear member 1142 are continuously interconnected by a connecting member 1172. The ring gear member 1144 is continuously interconnected with the input shaft 17, and selectively interconnectable with the sun gear member 1122 through the torque transmitting mechanism 1152. The ring gear member 1134 is continuously interconnected with the output shaft 19, selectively interconnectable with the sun gear member 1122 through the torque transmitting mechanism 1150, and selectively connectable with the planet carrier assembly member 1126 through the torque transmitting mechanism 1156. The planet carrier assembly member 1146 is selectively interconnectable with the sun gear member 1122 through the torque transmitting mechanism 1154, and selectively interconnectable with the planet carrier assembly member 1126 through the torque transmitting mechanism 1158.

The truth table, shown in FIG. 24, defines the torque transmitting mechanism engagement schedule required for each of the forward speed ratios and the reverse speed ratio. The truth table also indicates that the torque transmitting mechanism 1154 can remain engaged during the neutral condition thereby simplifying the first/reverse interchange. The numerical values for the ratios have been determined using the ring gear/sun gear tooth ratios given in FIG. 24. The R1/S1 value is the ring gear/sun gear tooth ratio of the planetary gear set 1120, the R2/S2 value is the ring gear/sun gear tooth ratio of the planetary gear set 1130, and the R3/S3 value is the ring gear/sun gear tooth ratio of the planetary gear set 1140. As can be determined from the truth table, the single ratio interchanges for the first six forward speed ratios are single transition interchanges, however the 6-7 interchange is a double transition ratio change. Also, the double step interchanges such as $1^{st}$ to $3^{rd}$, $2^{nd}$ to $4^{th}$, $3^{rd}$ to $5^{th}$, $4^{th}$ to $6^{th}$, and $5^{th}$ to $7^{th}$ are single transition interchanges. FIG.

24 also describes the step ratio between adjacent ratios, for example, the numerical step between $1^{st}$ and $2^{nd}$ is 1.68.

Those skilled in the art will recognize that the numerical value of the reverse speed ratio is determined by the planetary gear set 1130. The numerical value of the first forward speed ratio is determined by the planetary gear sets 1120, 1130, and 1140. The numerical value of the second forward speed ratio is determined by the planetary gear set 1120. The numerical value of the third forward speed ratio is determined by the planetary gear sets 1130 and 1140. The numerical value of the fourth forward speed ratio is determined by the planetary gear sets 1120, 1130, and 1140. The numerical value of the fifth forward speed ratio is determined by the planetary gear sets 1120, 1130, and 1140. The numerical value of the sixth forward speed ratio is determined by the planetary gear sets 1130 and 1140. The numerical value of the seventh forward speed ratio is one to one.

Figures 25, 26:
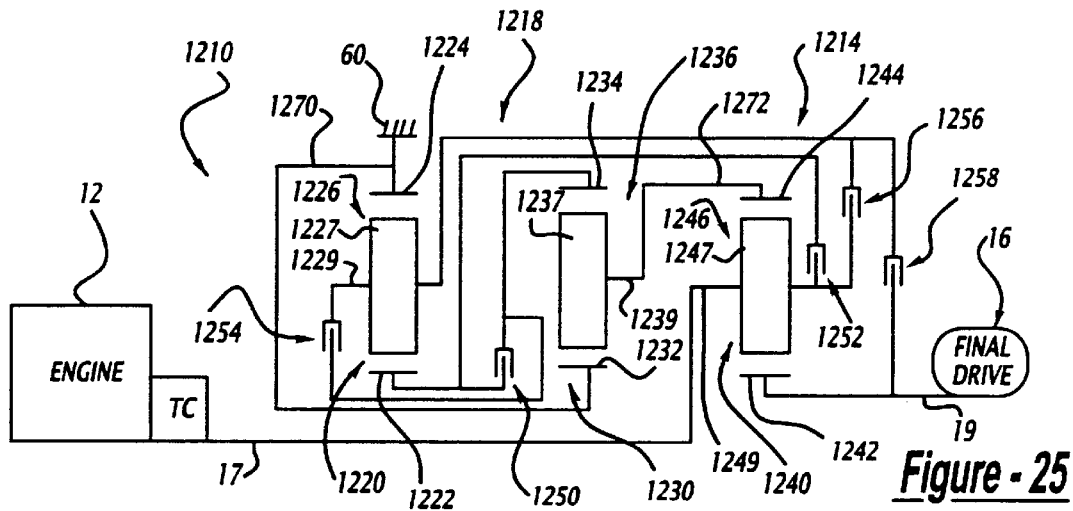
FIG. 25 is a schematic representation of powertrain incorporating another embodiment of the present invention.
FIG. 26 is a truth table and chart describing some of the operating characteristics of the powertrain depicted in FIG. 25.

A powertrain 1210, shown in FIG. 25, has the conventional engine and torque converter 12, a planetary transmission 1214, and the conventional final drive 16. The engine and torque converter 12 are drivingly connected with the transmission 1214 through an input shaft 17. The transmission is drivingly connected with the final drive 16 through an output shaft 19. The planetary transmission 1214 includes a planetary gear arrangement 1218 that includes a first planetary gear set 1220, a second planetary gear set 1230 and a third planetary gear set 1240. The planetary transmission also includes five torque transmitting mechanisms 1250, 1252, 1254, 1256, and 1258 which are conventional selectively engageable fluid-operated devices. The planetary gear arrangement 1218 can be controlled through the selection of the torque transmitting mechanisms to provide either six or seven forward speed ratios.

The planetary gear set 1220 includes a sun gear member 1222, a ring gear member 1224, and a planet carrier assembly member 1226 that has a plurality of planet pinion gear members 1227 rotatably mounted on a planet carrier 1229 and disposed in meshing relation with the sun gear member 1222 and the ring gear member 1224. The planetary gear set 1230 includes a sun gear member 1232, a ring gear member 1234, and a planet carrier assembly member 1236 that has a plurality of planet pinion gears 1237 rotatably mounted on a planet carrier 1239 and disposed in meshing relation with the sun gear member 1232 and the ring gear member 1234. The planetary gear set 1240 has a sun gear member 1242, a ring gear member 1244, and a planet carrier assembly member 1246 that includes a plurality of planet pinion gears 1247 rotatably mounted on a planet carrier 1249 and disposed in meshing relation with the sun gear member 1242 and the ring gear member 1244.

The ring gear member 1224 and the sun gear member 1232 are continuously interconnected with the housing 60 by a connecting member 1270. The planet carrier assembly member 1236 and the ring gear member 1244 are continuously interconnected by a connecting member 1272. The planet carrier assembly member 1246 is continuously interconnected with the input shaft 17, selectively interconnectable with the sun gear member 1222 through the torque transmitting mechanism 1252, and selectively interconnectable with the planet carrier assembly member 1226 through the torque transmitting mechanism 1256. The sun gear member 1242 is continuously interconnected with the output shaft 19, and selectively interconnectable with the planet carrier assembly member 1226 through the torque transmitting mechanism 1258. The ring gear member 1234 is selectively interconnectable with the sun gear member 1222 through the torque transmitting mechanism 1250, and selectively interconnectable with the planet carrier assembly member 1226 through the torque transmitting mechanism 1254.

The truth table, shown in FIG. 26, defines the torque transmitting mechanism engagement required for each of the seven forward speed ratios and the reverse speed ratio. A neutral condition is achieved with the disengagement of all of the torque transmitting mechanisms. The numerical values for the ratios have been determined using the ring gear/sun gear tooth ratios given in FIG. 26. The R1/S1 value is the ring gear/sun gear tooth ratio of the planetary gear set 1220, the R2/S2 value is the ring gear/sun gear tooth ratio of the planetary gear set 1230, and the R3/S3 value is the ring gear/sun gear tooth ratio of the planetary gear set 1240. As can be determined from the truth table, the single ratio interchanges for the forward speed ratios are single transition interchanges. Also, the double step interchanges such as $1^{st}$ to $3^{rd}$, $2^{nd}$ to $4^{th}$, $3^{rd}$ to $5^{th}$, $4^{th}$ to $6^{th}$, and $5^{th}$ to $7^{th}$ are also single transition interchanges. FIG. 26 also describes the step ratio between adjacent ratios, for example, the numerical step between $1^{st}$ and $2^{nd}$ is 2.03.

Those skilled in the art will recognize that the numerical value of the reverse speed ratio is determined by the planetary gear sets 1220, 1230, and 1240. The numerical value of the first forward speed ratio is determined by the planetary gear set 1220. The numerical value of the second forward speed ratio is determined by the planetary gear sets 1220, 1230, and 1240. The numerical value of the third forward speed ratio is one to one. The numerical value of the fourth forward speed ratio is determined by the planetary gear sets 1230 and 1240. The numerical value of the fifth forward speed ratio is determined by the planetary gear sets 1230 and 1240. The numerical value of the sixth forward speed ratio is determined by the planetary gear sets 1220, 1230, and 1240. The numerical value of the seventh forward speed ratio is determined by the planetary gear set 1240.

Figures 27, 28:
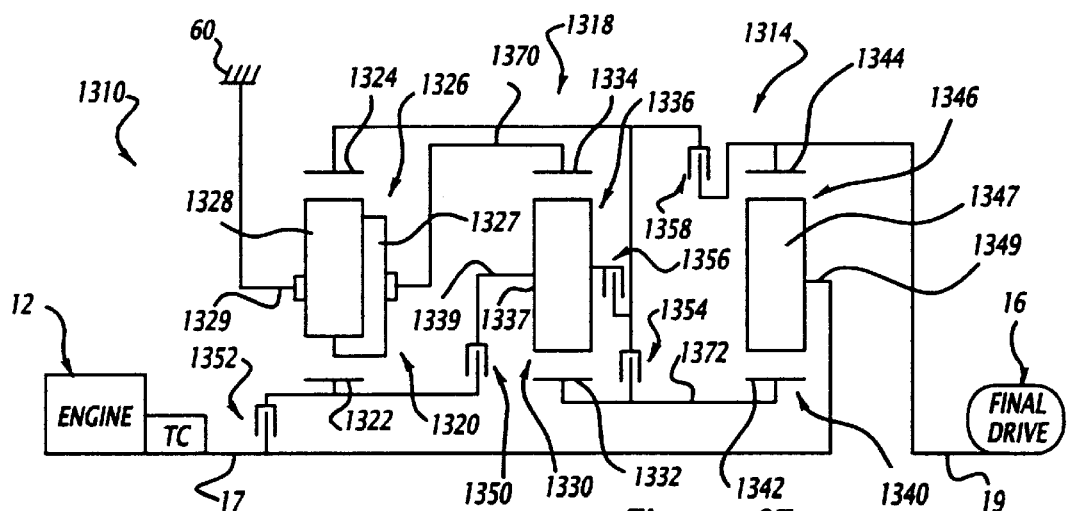
FIG. 27 is schematic representation of a powertrain incorporating another embodiment of the present invention.
FIG. 28 is a truth table and chart describing some of the operating characteristics of the powertrain depicted in FIG. 27.

A powertrain 1310, shown in FIG. 27, has the conventional engine and torque converter 12, a planetary transmission 1314, and the conventional final drive 16. The engine and torque converter 12 are drivingly connected with the transmission 1314 through an input shaft 17. The transmission is drivingly connected with the final drive 16 through an output shaft 19. The planetary transmission 1314 includes a planetary gear arrangement 1318 that includes a first planetary gear set 1320, a second planetary gear set 1330 and a third planetary gear set 1340. The planetary transmission also includes five torque transmitting mechanisms 1350, 1352, 1354, 1356, and 1358 which are conventional selectively engageable fluid-operated devices that are controlled to establish six or seven forward speed ratios and one reverse ratio as depicted in the truth table of FIG. 28.

The planetary gear set 1320 includes a sun gear member 1322, a ring gear member 1324, and a planet carrier assembly member 1326 that has a plurality of intermeshing planet pinion gear members 1327 and 1328 rotatably mounted on a planet carrier 1329 and disposed in meshing relation with the sun gear member 1322 and the ring gear member 1324, respectively. The planetary gear set 1330 includes a sun gear member 1332, a ring gear member 1334, and a planet carrier assembly member 1336 that has a plurality of planet pinion gears 1337 rotatably mounted on a planet carrier 1339 and disposed in meshing relation with the sun gear member 1332 and the ring gear member 1334. The planetary gear set 1340 has a sun gear member 1342, a ring gear member 1344, and a planet carrier assembly member 1346 that includes a plurality of planet pinion gears 1347 rotatably mounted on a planet carrier 1349 and disposed in meshing relation with the sun gear member 1342 and the ring gear member 1344.

The planet carrier assembly member 1326 and the ring gear member 1334 are continuously interconnected with the housing 60 through a connecting member 1370. The sun gear member 1332 and the sun gear member 1342 are continuously interconnected through a connecting member 1372, and selectively interconnectable with the ring gear member 1324 through the torque transmitting mechanism 1354. The planet carrier assembly member 1346 is continuously interconnected with the input shaft 17, and selectively interconnectable with the sun gear member 1322 through the torque transmitting mechanism 1352. The output shaft 19 is continuously interconnected with the ring gear member 1344, and selectively interconnectable with the ring gear member 1324 through the torque transmitting mechanism 1358. The planet carrier assembly member 1336 is selectively interconnectable with the sun gear member 1322 through the torque transmitting mechanism 1350, and selectively interconnectable with the ring gear member 1324 through the torque transmitting mechanism 1356.

The truth table, shown in FIG. 28, defines the torque transmitting mechanism engagement required for each of the seven forward speed ratios and the reverse speed ratio. The truth table also indicates that the torque transmitting mechanism 1350 can remain engaged during the neutral condition thereby simplifying the first/reverse interchange. The numerical values for the ratios have been determined using the ring gear/sun gear tooth ratios given in FIG. 28. The R1/S1 value is the ring gear/sun gear tooth ratio of the planetary gear set 1320, the R2/S2 value is the ring gear/sun gear tooth ratio of the planetary gear set 1330, and the R3/S3 value is the ring gear/sun gear tooth ratio of the planetary gear set 1340. As can be determined from the truth table, the single ratio interchanges for the forward speed ratios, with the exception of the $4^{th}$ to $5^{th}$ are single transition interchanges. Also, the double step interchanges such as $1^{st}$ to $3^{rd}$, $2^{nd}$ to $4^{th}$, $3^{rd}$ to $5^{th}$, $4^{th}$ to $6^{th}$, and $5^{th}$ to $7^{th}$ are single transition interchanges. FIG. 28 also describes the step ratio between adjacent ratios, for example, the numerical step between $1^{st}$ and $2^{nd}$ is 1.52.

Those skilled in the art will recognize that the numerical value of the reverse speed ratio is determined by the planetary gear sets 1330 and 1340. The numerical value of the first forward speed ratio is determined by the planetary gear sets 1320, 1330, and 1340. The numerical value of the second forward speed ratio is determined by the planetary gear set 1320. The numerical value of the third forward speed ratio is determined by the planetary gear sets 1330 and 1340. The numerical value of the fourth forward speed ratio is determined by the planetary gear sets 1320, 1330, and 1340. The numerical value of the fifth forward speed ratio is one to one. The numerical value of the sixth forward speed ratio is determined by the planetary gear sets 1320 and 1340. The numerical value of the seventh forward speed ratio is determined by the planetary gear sets 1320, 1330, and 1340.

Figures 29, 30:
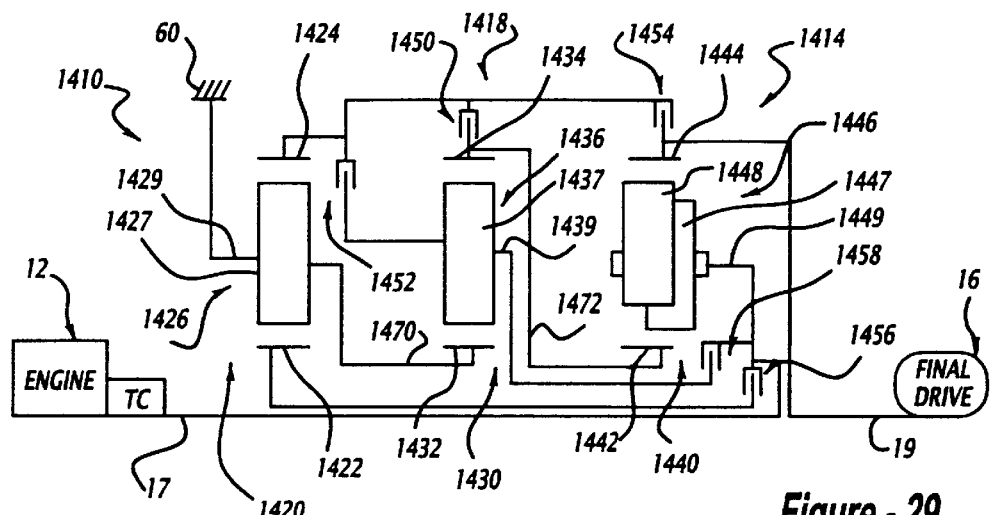
FIG. 29 is schematic representation of a powertrain incorporating another embodiment of the present invention.
FIG. 30 is a truth table and chart describing some of the operating characteristics of the powertrain depicted in FIG. 29.

A powertrain 1410, shown in FIG. 29, has the conventional engine and torque converter 12, a planetary transmission 1414, and the conventional final drive 16. The engine and torque converter 12 are drivingly connected with the transmission 1414 through an input shaft 17. The transmission is drivingly connected with the final drive 16 through an output shaft 19. The planetary transmission 1414 includes a planetary gear arrangement 1418 that includes a first planetary gear set 1420, a second planetary gear set 1430 and a third planetary gear set 1440. The planetary transmission also includes five torque transmitting mechanisms 1450, 1452, 1454, 1456, and 1458 which are conventional selectively engageable fluid-operated devices that are controlled to establish six forward speed ratios and one reverse ratio as depicted in the truth table of FIG. 30.

The planetary gear set 1420 includes a sun gear member 1422, a ring gear member 1424, and a planet carrier assembly member 1426 that has a plurality of planet pinion gear members 1427 rotatably mounted on a planet carrier 1429 and disposed in meshing relation with the sun gear member 1422 and the ring gear member 1424. The planetary gear set 1430 includes a sun gear member 1432, a ring gear member 1434, and a planet carrier assembly member 1436 that has a plurality of planet pinion gears 1437 rotatably mounted on a planet carrier 1439 and disposed in meshing relation with the sun gear member 1432 and the ring gear member 1434. The planetary gear set 1440 has a sun gear member 1442, a ring gear member 1444, and a planet carrier assembly member 1446 that includes a plurality of intermeshing planet pinion gears 1447 and 1448 rotatably mounted on a planet carrier 1449 and disposed in meshing relation with the sun gear member 1442 and the ring gear member 1444, respectively.

The planet carrier assembly member 1426 and the sun gear member 1432 are continuously interconnected with the housing 60 through a connecting member 1470. The ring gear member 1434 and the sun gear member 1442 are continuously interconnected for common rotation by a connecting member 1472, and selectively connectable with the ring gear member 1424 through the torque transmitting mechanism 1450. The planet carrier assembly member 1446 is continuously interconnected with the input shaft 17, selectively interconnectable with the planet carrier assembly member 1436 through the torque transmitting mechanism 1458, and selectively interconnectable with the sun gear member 1422 through the torque transmitting mechanism 1456. The ring gear member 1444 is continuously interconnected with the output shaft 19, and selectively interconnectable with the ring gear member 1424 through the torque transmitting mechanism 1454. The ring gear member 1424 and the planet carrier assembly member 1436 are selectively interconnectable through the torque transmitting mechanism 1452.

The truth table, shown in FIG. 30, defines the torque transmitting mechanism engagement required for each of the six forward speed ratios and the reverse speed ratio. The truth table also indicates that the torque transmitting mechanism 1456 can remain engaged during the neutral condition thereby simplifying the first/reverse interchange. The numerical values for the ratios have been determined using the ring gear/sun gear tooth ratios given in FIG. 30. The R1/S1 value is the ring gear/sun gear tooth ratio of the planetary gear set 1420, the R2/S2 value is the ring gear/sun gear tooth ratio of the planetary gear set 1430, and the R3/S3 value is the ring gear/sun gear tooth ratio of the planetary gear set 1440. As can be determined from the truth table, the single ratio interchanges for the forward speed ratios are single transition interchanges. Also, the double step interchanges such as $1^{st}$ to $3^{rd}$, $2^{nd}$ to $4^{th}$, and $4^{th}$ to $6^{th}$, are single transition interchanges. FIG. 30 also describes the step ratio between adjacent ratios, for example, the numerical step between $1^{st}$ and $2^{nd}$ is 1.40.

Those skilled in the art will recognize that the numerical value of the reverse speed ratio is determined by the planetary gear set 1420. The numerical value of the first forward speed ratio is determined by the planetary gear sets 1420, 1430, and 1440. The numerical value of the second forward speed ratio is determined by the planetary gear sets 1420 and 1440. The numerical value of the third forward speed ratio is determined by the planetary gear set 1440. The numerical value of the fourth forward speed ratio is one to one. The numerical value of the fifth forward speed ratio is determined by the planetary gear sets 1430 and 1440. The numerical value of the sixth forward speed ratio is determined by the planetary gear sets 1430 and 1440.

Figures 31, 32:
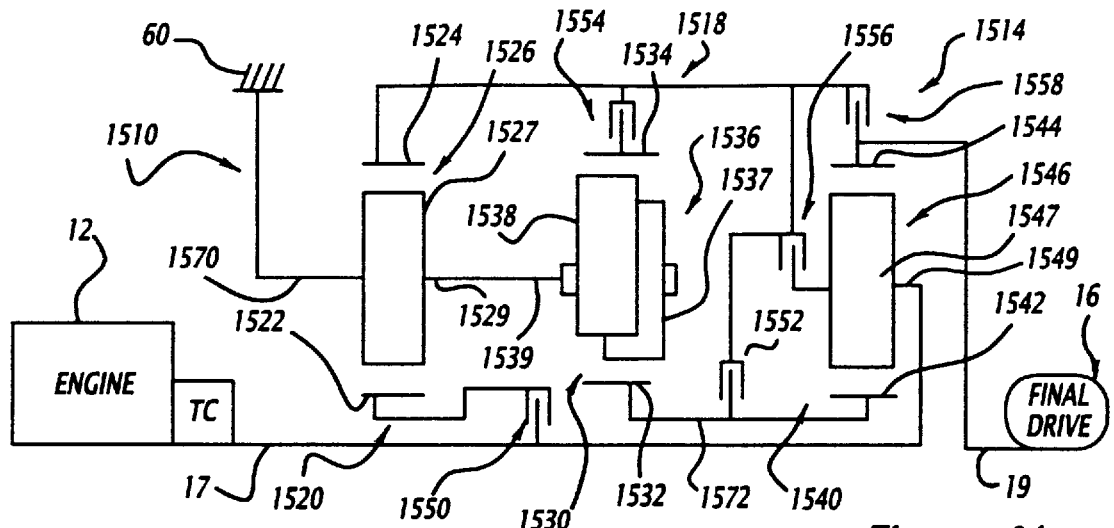
FIG. 31 is schematic representation of a powertrain incorporating another embodiment of the present invention.
FIG. 32 is a truth table and chart describing some of the operating characteristics of the powertrain depicted in FIG. 31.

A powertrain 1510, shown in FIG. 31, has the conventional engine and torque converter 12, a planetary transmission 1514, and the conventional final drive 16. The engine and torque converter 12 are drivingly connected with the transmission 1514 through an input shaft 17. The transmission is drivingly connected with the final drive 16 through an output shaft 19. The planetary transmission 1514 includes a planetary gear arrangement 1518 that includes a first planetary gear set 1520, a second planetary gear set 1530 and a third planetary gear set 1540. The planetary transmission also includes five torque transmitting mechanisms 1550, 1552, 1554, 1556, and 1558 which are conventional selectively engageable fluid-operated devices that are controlled to establish six forward speed ratios and one reverse ratio as depicted in the truth table of FIG. 32.

The planetary gear set 1520 includes a sun gear member 1522, a ring gear member 1524, and a planet carrier assembly member 1526 that has a plurality of planet pinion gear members 1527 rotatably mounted on a planet carrier 1529 and disposed in meshing relation with the sun gear member 1522 and the ring gear member 1524. The planetary gear set 1530 includes a sun gear member 1532, a ring gear member 1534, and a planet carrier assembly member 1536 that has a plurality of intermeshing planet pinion gears 1537 and 1538 rotatably mounted on a planet carrier 1539 and disposed in meshing relation with the sun gear member 1532 and the ring gear member 1534, respectively. The planetary gear set 1540 has a sun gear member 1542, a ring gear member 1544, and a planet carrier assembly member 1546 that includes a plurality of planet pinion gears 1547 rotatably mounted on a planet carrier 1549 and disposed in meshing relation with the sun gear member 1542 and the ring gear member 1544.

The planet carrier assembly member 1526 and the planet carrier assembly member 1536 are continuously interconnected with the housing 60 through a connecting member 1570. The sun gear member 1532 and the sun gear member 1542 are continuously interconnected by a connecting member 1572, and selectively interconnectable with the ring gear member 1524 through the torque transmitting mechanism 1552. The input shaft 17 and the planet carrier assembly member 1546 are continuously interconnected for common rotation, selectively interconnectable with the sun gear member 1522 through the torque transmitting mechanism 1550, and selectively interconnectable with the ring gear member 1524 through the torque transmitting mechanism 1556. The output shaft 19 and the ring gear member 1544 are continuously interconnected for common rotation, and selectively interconnectable with the ring gear member 1524 through the torque transmitting mechanism 1558.

The truth table, shown in FIG. 32, defines the torque transmitting mechanism engagement required for each of the six forward speed ratios and the reverse speed ratio. A neutral condition is achieved with the disengagement of all of the torque transmitting mechanisms. The numerical values for the ratios have been determined using the ring gear/sun gear tooth ratios given in FIG. 32. The R1/S1 value is the ring gear/sun gear tooth ratio of the planetary gear set 1520, the R2/S2 value is the ring gear/sun gear tooth ratio of the planetary gear set 1530, and the R3/S3 value is the ring gear/sun gear tooth ratio of the planetary gear set 1540. As can be determined from the truth table, the single ratio interchanges for the forward speed ratios are single transition interchanges. Also, the double step interchanges such as $2^{nd}$ to $4^{th}$, $3^{rd}$ to $5^{th}$, and $4^{th}$ to $6^{th}$ are single transition interchanges. FIG. 32 also describes the step ratio between adjacent ratios, for example, the numerical step between $1^{st}$ and $2^{nd}$ is 2.00.

Those skilled in the art will recognize that the numerical value of the reverse speed ratio is determined by the planetary gear set 1520. The numerical value of the first forward speed ratio is determined by the planetary gear sets 1530 and 1540. The numerical value of the second forward speed ratio is determined by the planetary gear sets 1530 and 1540. The numerical value of the third forward speed ratio is one to one. The numerical value of the fourth forward speed ratio is determined by the planetary gear set 1540. The numerical value of the fifth forward speed ratio is determined by the planetary gear sets 1520 and 1540. The numerical value of the sixth forward speed ratio is determined by the planetary gear sets 1520, 1530, and 1540.

It will be now apparent to those skilled in the art that each of the family members have many features in common which are not shared by others outside of the family. Each family member has a first, a second, and a third planetary gear set; and each planetary gear set has a first, a second, and a third member. All of the family members have five torque transmitting mechanism of the rotating type commonly named clutches. Each of the first members of the first and second planetary gear sets is continuously connected with a stationary portion of the transmission, and each of the first members of the third planetary gear set and the second member of the second planetary gear set are interconnected for common rotation by a connecting member. The input shaft is continuously connected with a member of the first, second or third planetary gear set, and the output shaft is continuously connected with the third member of the second or third planetary gear set. The first of the torque transmitting mechanisms selectively interconnects the second or third member of the first planetary gear set with the second or third member of the second or third planetary gear set. The second of the torque transmitting mechanisms selectively interconnects a member of the second or third planetary gear set with a member of the first planetary gear set. The third of the torque transmitting mechanisms selectively interconnects the second or third member of the third planetary gear set with a member of the first planetary gear set or the second or third member of the second planetary gear set. The fourth of the torque transmitting mechanisms selectively interconnects the input shaft or the output shaft with the second or third member of the first planetary gear set or the second or third member of the third planetary gear set. The fifth of the torque transmitting mechanisms selectively interconnects the input shaft or the output shaft with a member (second or third) of the first planetary gear set, or the third member of the second planetary gear set, or the second or third member of the third planetary gear set.

What is claimed is:

1. A multi speed transmissions for a powertrain comprising:
   an input shaft;
   an output shaft
   a transmission housing held stationary relative to said input shaft and said output shaft;
   a planetary gear arrangement comprising first, second, and third planetary gear sets and five torque transmitting mechanisms; each of said planetary gear sets having a first member, a second member, and a third member;

said first members of said first and second planetary gear sets being continuously interconnected with said transmission housing, said first member of said third planetary gear set and said second member of said second planetary gear set being continuously interconnected, one of said members of said first and third planetary gear sets being continuously connected with said input shaft, one of said members of said second planetary gear set and said third planetary gear set that is not continuously interconnected with said input shaft being continuously connected with said output shaft; and five torque transmitting mechanisms being selectively operated in combinations of two to establish at least six forward speed ratios and a reverse speed ratio between said input shaft and said output shaft wherein either a first of said torque-transmitting mechanisms is selectively interconnecting said second member of said second planetary gear set with said second member of said first planetary gear set, a second of said torque-transmitting mechanisms selectively interconnecting said second member of said first planetary gear set with said third member of said third planetary gear set, a third of said torque-transmitting mechanisms selectively interconnecting said second member of said first planetary gear set with said second member of said third planetary gear set, a fourth of said torque-transmitting mechanisms selectively interconnecting said third member of said first planetary gear set with said third member of said second planetary gear set, and a fifth of said torque-transmitting mechanisms selectively interconnecting said third member of said first planetary gear set with said third member of said third planetary gear set, or said first torque-transmitting mechanism selectively interconnecting said second member of said first planetary gear set with said second member of said second planetary gear set, said second torque-transmitting mechanism selectively interconnecting said second member of said first planetary gear set with said third member of said second planetary gear set, said third torque-transmitting mechanism selectively interconnecting said second member of said first planetary gear set with said third member of said third planetary ear set, said fourth torque-transmitting mechanism selectively interconnecting said second member of said first planetary gear set with said second member of said third planetary gear set, and said fifth torque-transmitting mechanism selectively interconnecting said third member of said first planetary gear set with said third member of said third planetary gear set, or said first torque-transmitting mechanism selectively interconnecting second member of said first planetary gear set with said third member of said second planetary gear set, said second torque-transmitting mechanism selectively interconnecting said second member of said first planetary gear set with said third member of said third planetary gear set, said third torque-transmitting mechanism selectively interconnecting said third member of said first planetary gear set with said third member of said third planetary gear set, said fourth torque-transmitting mechanism selectively interconnecting said second member of said second planetary gear set with said third member of said third planetary gear set, and said fifth torque-transmitting mechanism selectively interconnecting said third member of said second planetary gear set with said second member of said third planetary gear set, or said first torque-transmitting mechanism selectively interconnecting said second member of said first planetary gear set with said second member of said second planetary gear set, said second torque-transmitting mechanism selectively interconnecting said second member of said first planetary gear set with said third member of said second planetary gear set, said third torque-transmitting mechanism selectively interconnecting said second member of said first planetary gear set with said third member of said third planetary gear set, said fourth torque-transmitting mechanism selectively interconnecting said second member of said first planetary gear set with said second member of said third planetary gear set, and said fifth torque-transmitting mechanism selectively interconnecting said third member of said first planetary gear set with said third member of said third planetary gear set, or said first torque-transmitting mechanism selectively interconnecting said second member of said first planetary gear set with said second member of said second planetary gear set, said second torque-transmitting mechanism selectively interconnecting said second member of said first planetary gear set with said third member of said second planetary gear set, said third torque-transmitting mechanism selectively interconnecting said second member of said first planetary gear set with said second member of said third planetary gear set, said fourth torque-transmitting mechanism selectively interconnecting said third member of said first planetary gear set with said third member of said third planetary gear set, and said fifth torque-transmitting mechanism selectively interconnecting said third member of said second planetary gear set with said third member of said third planetary gear set, or said first torque-transmitting mechanism selectively interconnecting said second member of said first planetary gear set with said second member of said second planetary gear set, said second torque-transmitting mechanism selectively interconnecting said second member of said first planetary gear set with said third member of said third planetary gear set, said third torque-transmitting mechanism selectively interconnecting said third member of said first planetary gear set with said third member of said second planetary gear set, said fourth torque-transmitting mechanism selectively interconnecting said third member of said first planetary gear set with said second member of said third planetary gear set, said fifth torque-transmitting mechanism selectively interconnecting said third member of said first planetary gear set with said third member of said third planetary gear set, or first torque-transmitting mechanism selectively interconnecting said second member of said first planetary gear set with said third member of said third planetary gear set, said second torque-transmitting mechanism selectively interconnecting said third member of said first planetary gear set with said third member of said second planetary gear set, said third torque-transmitting mechanism selectively interconnecting said third member of said first planetary gear set with said third member of said third planetary gear set, said fourth torque-transmitting mechanism selectively interconnecting said third member of said second planetary gear set with said second member of said third planetary gear set, and said fifth torque-transmitting mechanism selectively interconnecting said third member of said third planetary gear set with said second member of said third planetary gear set, or said first torque-transmitting mechanism selectively interconnecting said second member of said first planetary gear set with said second member of said third planetary gear set, said second torque-transmitting mechanism selectively interconnecting said third member of said first planetary gear set with said second member of said third planetary gear set, said third torque-transmitting mechanism selectively interconnecting said third member of said first planetary gear set with said third member of said third planetary gear set, said fourth torque-transmitting mechanism selectively interconnecting said third member of said second planetary gear set with said second member of said third planetary gear set, and said fifth torque-transmitting mechanism selectively interconnecting said third member of said second planetary gear set with said third member of said third planetary gear set, or said first torque-transmitting mechanism selectively interconnecting said second member of said first planetary gear set with said third member of said third planetary gear set, said second torque-transmitting mechanism selectively interconnecting said third member of said first planetary gear set with said second member of said second planetary gear set, said third torque-transmitting mechanism selectively interconnecting third member of said first planetary gear set with said third member of said second planetary gear set, said fourth torque-transmitting mechanism selectively interconnecting said third member of said first planetary gear set with said third member of said third planetary gear set, and said fifth torque-transmitting mechanism selectively interconnecting said third member of said first planetary gear set with said second member of said third planetary gear set, or said first torque-transmitting mechanism selectively interconnecting said second member of said first planetary gear set with said third member of said third planetary gear set, said second torque-transmitting mechanism selectively interconnecting said third member of said first planetary gear set with said second member of said second planetary gear set, said third torque-transmitting mechanism selectively interconnecting said third member of said first planetary gear set with said third member of said second planetary gear set, said fourth torque-transmitting mechanism selectively interconnecting said third member of said first planetary gear set with said second member of said third planetary gear set, and said fifth torque-transmitting mechanism selectively interconnecting said third member of said second planetary gear set with said third member of said third planetary gear set, or said first torque-transmitting mechanism selectively interconnecting said second member of said first planetary gear set with said second member of said second planetary gear set, said second torque-transmitting mechanism selectively interconnecting said second member of said first planetary gear set with said third member of said second planetary gear set, said third torque-transmitting mechanism selectively interconnecting said second member of said first planetary gear set with said third member of said third planetary gear set, said fourth torque-transmitting mechanism selectively interconnecting said third member of said first planetary gear set with said second member of said second planetary gear set, and said fifth torque-transmitting mechanism selectively interconnecting said third member of said first planetary gear set with said second member of said third planetary gear set, or said first torque-transmitting mechanism selectively interconnecting said second member of said first planetary gear set with said third member of said second planetary gear set, said second torque-transmitting mechanism selectively interconnecting said second member of said first planetary gear set with said third member of said third planetary gear set, said third torque-transmitting mechanism selectively interconnecting said second member of said first planetary gear set with said second member of said third planetary gear set, said fourth torque-transmitting mechanism selectively interconnecting said third member of said first planetary gear set with said third member of said second planetary gear set, and said fifth torque-transmitting mechanism selectively interconnecting said third member of said first planetary gear set with said second member of said third planetary gear set, or said first torque-transmitting mechanism selectively interconnecting said second member of said first planetary gear set with said third member of said second planetary gear set, said second torque-transmitting mechanism selectively interconnecting said second member of said first planetary gear set with said third member of said third planetary gear set, said third torque-transmitting mechanism selectively interconnecting said third member of said first planetary gear set with said third member of said second planetary gear set, and said fifth torque-transmitting mechanism selectively interconnecting said third member of said first planetary gear set with said second member of said third planetary gear set, or said first torque-transmitting mechanism selectively interconnecting said second member of said first planetary gear set with said third member of said second planetary gear set, said second torque-transmitting mechanism selectively interconnecting said second member of said first planetary gear set with said third member of said third planetary gear set said third torque-transmitting mechanism selectively interconnecting said third member of said first planetary gear set with said second member of said second planetary gear set, said fourth torque-transmitting mechanism selectively interconnecting said third member of said first planetary gear set with said third member of said second planetary gear sex, and said fifth torque-transmitting mechanism selectively interconnecting said third member of said first planetary gear set with said second member of said third planetary gear set, or said first torque-transmitting mechanism selectively interconnecting said second member of said first planetary gear set with said second member of said second planetary gear set, said second torque-transmitting mechanism selectively interconnecting said second member of said first planetary gear set with said third member of said second planetary gear set, said third torque-transmitting mechanism selectively interconnecting said second member of said first planetary gear set with said second member of said third planetary gear set, said fourth torque-transmitting mechanism selectively interconnecting said third member of said first planetary gear set with said third member of said third planetary gear set, and said fifth torque-transmitting mechanism selectively interconnecting said third member of said second planetary gear set with said third member of said third planetary gear set, or said first torque-transmitting mechanism selectively interconnecting said second member of said first planetary gear set with said third member of said third planetary gear set, said second torque-transmitting mechanism selectively interconnecting said third member of said first planetary gear set with said first member of said third planetary gear set, said third torque-transmitting mechanism selectively interconnecting said third member of said first planetary gear set with said third member of said second planetary gear set, said fourth torque-transmitting mechanism selectively interconnecting said third member of said first planetary gear set with said third member of said third planetary gear set, and said fifth torque-transmitting mechanism selectively interconnecting said third member of said first planetary gear set with said second member of said third planetary gear set.

2. The multi speed transmissions defined in claim 1 further wherein:

said torque transmitting mechanisms are each a fluid-operated, selectively engageable clutch; and each of said first, second, and third members of said first, second, and third planetary gear sets are one of a sun gear member, a ring gear member, and a planet carrier member.

3. The multi speed transmissions defined in claim 1 further wherein:

said first member of said first planetary gear set is a ring gear member, or a sun gear member, or a planet carrier assembly member;

said first member of said second planetary gear set is a ring gear member, or a sun gear member, or a planet carrier assembly member; and said first member of said third planetary gear set is a ring gear member, or a sun gear member, or a planet carrier assembly member.

4. A multi speed transmission comprising:

an input shaft;

an output shaft;

a housing held stationary relative to said input shaft and said output shaft;

a first planetary gear set having first, second, and third members, a second planetary gear set having first, second, and third members, and a third planetary gear set having first, second, and third members;

said first members of said first and second planetary gear sets being continuously connected with said housing;

said second member of said second planetary gear set and said first member of said third planetary gear set being continuously interconnected with a connecting member;

five clutches being selectively engaged in combinations of two to establish at least six forward speed ratios and a reverse speed ratio between said input shaft and said output shaft wherein either said input shaft is continuously connected with said connecting member, said output shaft is continuously connected with said second member of said third planetary gear set, a first of said clutch is selectively interconnecting said second member of said second planetary gear set with said second member of said first planetary gear set, a second of said clutch selectively interconnecting said second member of said first planetary gear set with said third member of said third planetary gear set, a third of said clutch selectively interconnecting said second member of said first planetary gear set with said second member of said third planetary gear set, a fourth of said clutch selectively interconnecting said third member of said first planetary gear set with said third member of said second planetary gear set, and a fifth of said clutch selectively interconnecting said third member of said first planetary gear set with said third member of said third planetary gear set, or said input shaft is continuously connected with said connecting member, said output shaft is continuously connected with said second member of said third planetary gear set, said first clutch selectively interconnecting said second member of said first planetary gear set with said second member of said second planetary gear set, said second clutch selectively interconnecting said second member of said first planetary gear set with said third member of said second planetary gear set, said third clutch selectively interconnecting said second member of said first planetary gear set with said third member of said third planetary gear set, said fourth clutch selectively interconnecting said second member of said first planetary gear set with said second member of said third planetary gear set, and said fifth clutch selectively interconnecting said third member of said first planetary gear set with said third member of said third planetary gear set, or said input shaft is continuously connected with said second member of said first planetary gear set, said output shaft is continuously connected with said second member of said third planetary gear set, said first clutch selectively interconnecting second member of said fist planetary gear set with said third member of said second planetary gear set, said second clutch selectively interconnecting said second member of said first planetary gear set with said third member of said third planetary gear set, said third clutch selectively interconnecting said third member of said first planetary gear set with said third member of said third planetary gear set, said fourth clutch selectively interconnecting said second member of said second planetary gear set with said third member of said third planetary gear set, and said fifth clutch selectively interconnecting said third member of said second planetary gear set with said second member of said third planetary gear set, or said input shaft is continuously connected with said third member of said third planetary gear set, said output shaft is continuously connected with said second member of said third planetary gear set said first clutch selectively interconnecting said second member of said first planetary gear set with said second member of said second planetary gear set, said second clutch selectively interconnecting said second member of said first planetary gear set with said third member of said second planetary gear set, said third clutch selectively interconnecting said second member of said first planetary gear set with said third member of said third planetary gear set, said fourth clutch selectively interconnecting said second member of said first planetary gear set with said second member of said third planetary gear set, and said fifth clutch selectively interconnecting said third member of said first planetary gear set with said third member of said third planetary gear set, or said input shaft is continuously connected with said third member of said third planetary gear set, said output shaft is continuously connected with said second member of said third planetary gear set, said first clutch selectively interconnecting said second member of said first planetary gear set with said second member of said second planetary gear set, said second clutch selectively interconnecting said second member of said first planetary gear set with said third member of said second planetary gear set, said third clutch selectively interconnecting said second member of said first planetary gear set with said second member of said third planetary gear set, said fourth clutch selectively interconnecting said third member of said first planetary gear set with said third member of said third planetary gear set, and said fifth clutch selectively interconnecting said third member of said second planetary gear set with said third member of said third planetary gear set, or said input shaft is continuously connected with said second member of said third planetary gear set, said output shaft is continuously connected with said connecting member, said first clutch selectively interconnecting said second member of said first planetary gear set with said second member of said second planetary gear set, said second clutch selectively interconnecting said second member of said first planetary gear set with said third member of said third planetary gear set, said third clutch selectively interconnecting said third member of said first planetary gear set with said third member of said second planetary gear set, said fourth clutch selectively interconnecting said third member of said first planetary gear set with said second member of said third planetary gear set, said fifth clutch selectively interconnecting said third member of said first planetary gear set with said third member of said third planetary gear set, or said input shaft is continuously connected with said second member of said first planetary gear set, said output shaft is continuously connected with said second member of said third planetary gear set, said first clutch selectively interconnecting said second member of said first planetary gear set with said third member of said third planetary gear set, said second clutch selectively interconnecting said third member of said first planetary gear set with said third member of said second planetary gear set, said third clutch selectively interconnecting said third member of said first planetary gear set with said third member of said third planetary gear set, said fourth clutch selectively interconnecting said third member of said second planetary gear set with said second member of said third planetary gear set, and said fifth clutch selectively interconnecting said third member of said third planetary gear set with said second member of said third planetary gear set, or said input shaft is continuously connected with said second member of said first planetary gear set, said output shaft is continuously connected with said third member of said second planetary gear set, said first clutch selectively interconnecting said second member of said first planetary gear set with said second member of said third planetary gear set, said second clutch selectively interconnecting said third member of said first planetary gear set with said second member of said third planetary gear set, said third clutch selectively interconnecting said third member of said first planetary gear set with said third member of said third planetary gear set, said fourth clutch selectively interconnecting said third member of said second planetary gear set with said second member of said third planetary gear set, and said fifth clutch selectively interconnecting said third member of said second planetary gear set with said third member of said third planetary gear set, or said input shaft is continuously connected with said third member of said third planetary gear set, said output shaft is continuously connected with said second member of said third planetary gear set, said first clutch selectively interconnecting said second member of said first planetary gear set with said third member of said third planetary gear set, said second clutch selectively interconnecting said third member of said first planetary gear set with said second member of said second planetary gear set, said third clutch selectively interconnecting third member of said first lane ear set with said third member of said second lane gear set, said fourth clutch selectively interconnecting said third member of said first planetary gear set with said third member of said third planetary gear set, and said fifth clutch selectively interconnecting said third member of said first planetary gear set with said second member of said third planetary gear set, or said input shaft is continuously connected with said third member of said third planetary gear set, said output shaft is continuously connected with said second member of said third planetary gear set, said first clutch selectively interconnecting said second member of said first planetary gear set with said third member of said third planetary gear set, said second clutch selectively interconnecting said third member of said first planetary gear set with said second member of said second planetary gear set, said third clutch selectively interconnecting said third member of said first planetary gear set with said third member of said second planetary gear set, said fourth clutch selectively interconnecting said third member of said first planetary gear set with said second member of said third planetary gear set, and said fifth clutch selectively interconnecting said third member of said second planetary gear set with said third member of said third planetary gear set, or said input shaft is continuously connected with said third member of said third planetary gear set, said output shaft is continuously connected with said second member of said third planetary gear set, said first clutch selectively interconnecting said second member of said first planetary gear set with said second member of said second planetary gear set, said second clutch selectively interconnecting said second member of said first planetary gear set with said third member of said second planetary gear set, said third clutch selectively interconnecting said second member of said first planetary gear set with said third member of said third planetary gear set, said fourth clutch selectively interconnecting said third member of said first planetary gear set with said second member of said second planetary gear set, and said fifth clutch selectively interconnecting said third member of said first planetary gear set with said second member of said third planetary gear set, or said input shaft is continuously connected with said third member of said third planetary gear set, said output shaft is continuously connected with said second member of said second planetary gear set, said first clutch selectively interconnecting said second member of said first planetary gear set with said third member of said second planetary gear set, said second clutch selectively interconnecting said second member of said first planetary gear set with said third member of said third planetary gear set, said third clutch selectively interconnecting said second member of said first planetary gear set with said second member of said third planetary gear set, said fourth clutch selectively interconnecting said third member of said first planetary gear set with said third member of said second planetary gear set, and said fifth clutch selectively interconnecting said third member of said first planetary gear set with said second member of said third planetary gear set, or said input shaft is continuously connected with said third member of said third planetary gear set, said output shaft is continuously connected with said second member of said third planetary gear set, said first clutch selectively interconnecting said second member of said first planetary gear set with said third member of said second planetary gear set, said second clutch selectively interconnecting said second member of said first planetary gear set with said third member of said third planetary gear set, said third clutch selectively interconnecting said third member of said first planetary gear set with said third member of said second planetary gear set, said fourth clutch selectively interconnecting said third member of said first planetary gear set with said third member of said third planetary gear set, and said fifth clutch selectively interconnecting said third member of said first planetary gear set with said second member of said third planetary gear set, or said input shaft is continuously connected with said third member of said third planetary gear set, said output shaft is continuously connected with said second member of said third planetary gear set, said first clutch selectively interconnecting said second member of said first planetary gear set with said third member of said second planetary gear set, said second clutch selectively interconnecting said second member of said first planetary gear set with said third member of said third planetary gear set, said third clutch selectively interconnecting said third member of said first planetary gear set with said second member of said second planetary gear set, said fourth clutch selectively interconnecting said third member of said first planetary gear set with said third member of said second planetary gear set, and said fifth clutch selectively interconnecting said third member of said first planetary gear set with said second member of said third planetary gear set, or said input shaft is continuously connected with said third member of said third planetary gear set, said output shaft is continuously connected with said second member of said third planetary gear set, said first clutch selectively interconnecting said second member of said first planetary gear set with said second member of said second planetary gear set, said second clutch selectively interconnecting said second member of said first planetary gear set with said third member of said second planetary gear set, said third clutch selectively interconnecting said second member of said first planetary gear set with said second member of said third planetary gear set, said fourth clutch selectively interconnecting said third member of said first planetary gear set with said third member of said third planetary gear set, and said fifth clutch selectively interconnecting said third member of said second planetary gear set with said third member of said third planetary gear set, or said input shaft is continuously connected with said third member of said third planetary gear set, said output shaft is continuously connected with said second member of said third planetary gear set, said first clutch selectively interconnecting said second member of said first planetary gear set with said third member of said third planetary gear set, said second clutch selectively interconnecting said third member of said first planetary gear set with said first member of said third planetary gear set, said third clutch selectively interconnecting said third member of said first planetary gear set with said third member of said second planetary gear set, said fourth clutch selectively interconnecting said third member of said first planetary gear set with said third member of said third planetary gear set, and said fifth clutch selectively interconnecting said third member of said first planetary gear set with said second member of said third planetary gear set.

5. The multi speed transmissions defined in claim 4 further wherein:

one of said members of said first planetary gear set is a sun gear member, another of said members of said first planetary gear set is a ring gear member, and a further of said members of said first planetary gear set is a planet carrier assembly member;

one of said members of said second planetary gear set is a sun gear member, another of said members of said second planetary gear set is a ring gear member, and a further of said members of said second planetary gear set is a planet carrier assembly member; and one of said members of said third planetary gear set is a sun gear member, another of said members of said third planetary gear set is a ring gear member, and a further of said members of said third planetary gear set is a planet carrier assembly member.

6. A multi-speed power transmission comprising:

an input shaft;

an output shaft;

a transmission housing held stationary relative to said input shaft and relative to said output shaft;

a planetary gear arrangement including a first planetary gear set, a second planetary gear set, and a third planetary gear set, each planetary gear set having first, second and third members wherein the first, second and third members each comprise either a sun gear member, a ring gear member or a planet carrier assembly member, said first members of said first and second planetary gear sets being continuously interconnected with said transmission housing and being continuously held stationary thereby, said second member of said second planetary gear set and said first member of said third planetary gear set being continuously interconnected through an interconnecting member to rotate in unison;

said input shaft being continuously interconnected with at least one member of said planetary gear sets, and said output shaft being continuously interconnected with another member of said planetary gear sets that is not connected with said input shaft; and five selectively connectable torque-transmitting mechanism engageable in combinations of two to establish six forward speed ratios and one reverse ration between said input shaft and said output shaft.

* * * * *